(12) United States Patent
Nagai et al.

(10) Patent No.: US 7,298,108 B2
(45) Date of Patent: Nov. 20, 2007

(54) CONTROL SYSTEM FOR ELECTRIC ACTUATOR

(75) Inventors: Shigekazu Nagai, Adachi-ku (JP); Takeshi Hirose, Moriya (JP)

(73) Assignee: SMC Kabushiki Kaisha, Tokyo (JP)

( * ) Notice: Subject to any disclaimer, the term of this patent is extended or adjusted under 35 U.S.C. 154(b) by 65 days.

(21) Appl. No.: 11/273,343

(22) Filed: Nov. 15, 2005

(65) Prior Publication Data

US 2006/0113940 A1    Jun. 1, 2006

(30) Foreign Application Priority Data

Nov. 29, 2004  (JP) ............................. 2004-344871

(51) Int. Cl.
*F16H 25/20* (2006.01)
*B23Q 5/28* (2006.01)
*H02K 7/06* (2006.01)

(52) U.S. Cl. .................. 318/469; 318/468; 192/141; 192/143; 310/80; 74/89; 74/89.23

(58) Field of Classification Search .................. None
See application file for complete search history.

(56) References Cited

U.S. PATENT DOCUMENTS

| | | | | |
|---|---|---|---|---|
| 3,682,283 | A | * | 8/1972 | Sato ............................ 192/141 |
| 3,989,992 | A | | 11/1976 | Schmidt |
| 4,114,747 | A | * | 9/1978 | Eller ........................... 192/150 |
| 4,179,944 | A | * | 12/1979 | Conner ....................... 74/89.26 |
| 4,300,079 | A | | 11/1981 | Kawada et al. |
| 4,395,904 | A | | 8/1983 | Ivanov et al. |
| 4,467,250 | A | | 8/1984 | Thomasson |
| 4,494,051 | A | | 1/1985 | Bailey |
| 4,731,996 | A | | 3/1988 | Smith et al. |
| 4,910,419 | A | * | 3/1990 | Hayashi et al. ................ 310/13 |
| 5,346,045 | A | * | 9/1994 | Bennett et al. .............. 192/141 |
| 5,363,027 | A | | 11/1994 | Noguchi |
| 5,382,890 | A | | 1/1995 | Moh et al. |
| 5,843,494 | A | * | 12/1998 | Richardson .................. 425/468 |
| 5,852,996 | A | | 12/1998 | Nakamura et al. |
| 6,166,502 | A | | 12/2000 | Pattok et al. |
| 6,291,955 | B1 | | 9/2001 | Itabashi et al. |
| 6,321,611 | B1 | * | 11/2001 | Szu et al. .................... 74/89.37 |
| 6,333,617 | B1 | | 12/2001 | Itabashi et al. |
| 6,354,580 | B1 | | 3/2002 | Nagai et al. |
| 6,363,214 | B1 | | 3/2002 | Merello et al. |
| 6,593,716 | B1 | | 7/2003 | Lange et al. |
| 6,670,734 | B2 | | 12/2003 | Morishima et al. |

(Continued)

FOREIGN PATENT DOCUMENTS

DE          4215964 C2    2/1995

(Continued)

*Primary Examiner*—Lincoln Donovan
*Assistant Examiner*—Eduardo Colon Santana
(74) *Attorney, Agent, or Firm*—Paul A. Guss

(57) ABSTRACT

A driver comprises a direction-switching means which switches a rotation direction of a rotary driving source based on a direction instruction signal, a current amplifier/limiter which converts a voltage outputted from the direction-switching means into a corresponding current and which limits the current to a preset reference current $I_{MAX}$ (threshold value), a current sensor which detects the current supplied to the rotary driving source, and a current loop which feeds back a detection signal supplied from the current sensor to an upstream side of the current amplifier/limiter.

7 Claims, 42 Drawing Sheets

U.S. PATENT DOCUMENTS

| | | |
|---|---|---|
| 7,118,507 B2 * | 10/2006 | Tomita et al. ............... 475/263 |
| 2003/0122517 A1 | 7/2003 | Lange et al. |
| 2003/0205977 A1 | 11/2003 | Itabashi et al. |
| 2004/0130281 A1 | 7/2004 | Jensen |
| 2004/0152556 A1 * | 8/2004 | Tomita et al. ............... 475/258 |
| 2005/0022523 A1 | 2/2005 | Nagai et al. |
| 2005/0116674 A1 | 6/2005 | Nagai et al. |
| 2005/0272548 A1 | 12/2005 | Nagai et al. |
| 2006/0102697 A1 * | 5/2006 | Nagai et al. ................ 228/101 |

FOREIGN PATENT DOCUMENTS

| | | |
|---|---|---|
| DE | 19519948 A1 | 12/1996 |
| DE | 4322133 C3 | 1/1999 |
| JP | 06030543 A * | 2/1994 |
| JP | 2001-105332 | 4/2001 |
| JP | 2002-66969 | 3/2002 |
| JP | 2002-219625 | 8/2002 |
| JP | 2005-54862 | 3/2005 |
| JP | 2005-106284 | 4/2005 |
| JP | 2006-22950 | 1/2006 |

* cited by examiner

CONTROL SYSTEM FOR ELECTRIC ACTUATOR

BACKGROUND OF THE INVENTION

1. Field of the Invention:

The present invention relates to a control system for an electric actuator, which is capable of appropriately protecting a rotary driving source for driving the electric actuator.

2. Description of the Related Art:

In general, when an installation type industrial robot is used, a base is fixed by bolts or the like. When a tip end of the robot is excessively pressed or smashed by malfunctioning of the interlock or the like, the operation of the robot is stopped by detecting an overcurrent condition. That is, it is principally intended to prevent the robot and the workpiece from being destroyed, by detecting the overcurrent condition of the installation type industrial robot. The positional deviation of the robot itself is not taken into consideration.

In view of the above, Japanese Laid-Open Patent Publication No. 2002-66969 discloses a technical concept which is directed to prevent an automatic or unmanned transport vehicle from floating even when a tip end of a robot arm is excessively pressed to or smashed against surrounding equipment.

That is, Japanese Laid-Open Patent Publication No. 2002-66969 discloses a control apparatus which executes an operation for limiting current flowing to a servo motor for driving a joint of the robot arm if joint torque applied to the joint of the robot arm meets a predetermined limit value, when the tip end of the robot arm is moved based on attitude control and position control of the robot arm.

However, when the technical concept disclosed in the Japanese Laid-Open Patent Publication No. 2002-66969 is applied, for example, to an electric actuator for converting a rotary motion of a motor into a rectilinear motion of a slider or the like, it is necessary to provide a detector such as an encoder and a resolver, and a control circuit in order to control, for example, the position and the operation speed of the slider, in which the production cost becomes expensive.

SUMMARY OF THE INVENTION

A general object of the present invention is to provide a control system for an electric actuator, wherein the control system makes it possible to limit current to be applied to a rotary driving source by using a simple circuit, even when high load is applied to the rotary driving source which is provided in order to drive the electric actuator.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
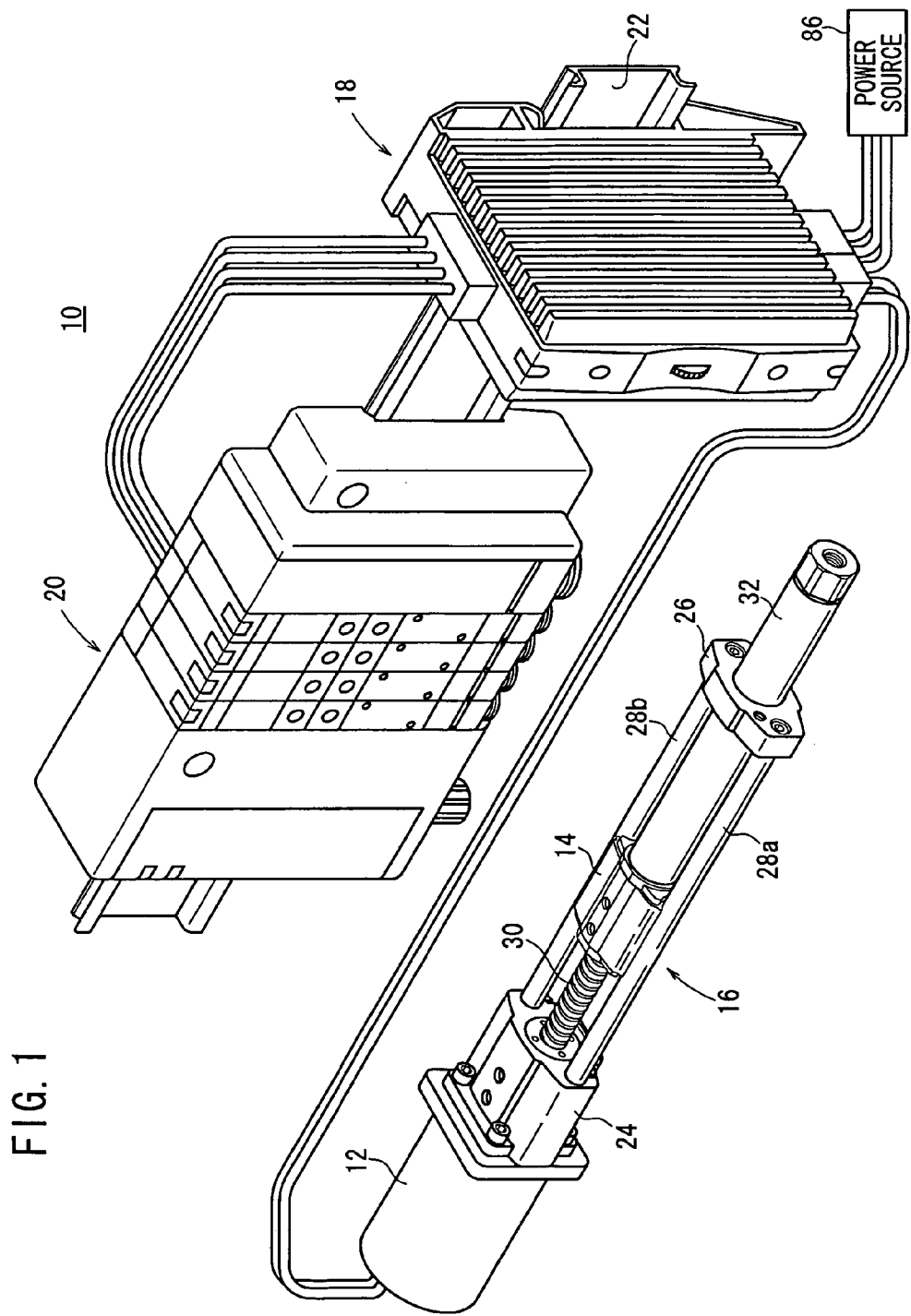
FIG. 1 is a perspective view illustrating a control system according to an embodiment of the present invention in which a driver for an electric actuator is incorporated.

With reference to FIG. 1, reference numeral 10 indicates a control system according to an embodiment of the present invention into which a driver for an electric actuator (hereinafter referred to as the "driver") is incorporated.

The control system 10 comprises an electric actuator 16 which includes a slider 14 that makes linear reciprocating motion under driving action of a rotary driving source 12, a driver 18 which energizes and deenergizes the rotary driving source 12 equipped for the electric actuator 16, and a controller 20 which outputs a direction instruction signal to the driver 18.

The controller 20 and the driver 18 are provided connectably via a rail member 22 which is engageable with recesses formed on each back surface of the casings of the controller 20 and the driver 18.

The rotary driving source 12 may be constructed by a motor, such as a brush DC motor, a brushless DC motor, an AC servo motor, an induction motor, and a stepping motor, to be driven and rotated. A linear motor such as a solenoid may be used in place of the rotary driving source 12.

The electric actuator 16 includes an actuator body 24, the rotary driving source 12 which is connected to one end of the actuator body 24 by screw members, a pair of guide shafts 28a, 28b which extend in parallel between the actuator body 24 and an end block 26, and a ball screw shaft 30 which is connected to a drive shaft of the rotary driving source 12 by an unillustrated coupling member.

The electric actuator 16 further includes the slider 14 which has an unillustrated ball screw nut screwed to the ball screw shaft 30 and which makes linear reciprocating motion with guidance of the pair of guide shafts 28a, 28b, and a rod 32 which is connected to the slider 14 and which has its part projecting toward the outside from the hole of the end block 26 and moving back and forth integrally with the slider 14. The slider 14 and the rod 32 function as the movable member.

Figure 2:
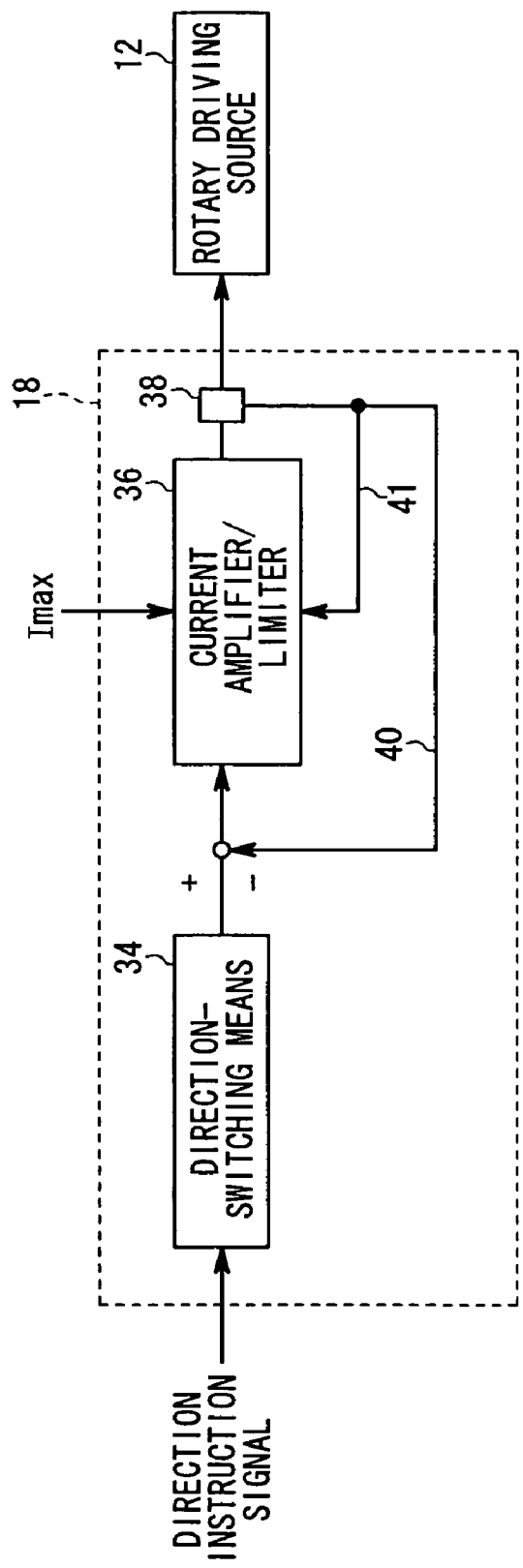
FIG. 2 is a schematic block diagram illustrating an arrangement of the driver for the electric actuator shown in FIG. 1.

Next, FIG. 2 shows a schematic block diagram illustrating an arrangement of the driver 18.

The driver 18 includes a direction-switching means 34 which switches the rotation direction of the rotary driving source 12 into a forward or backward direction by switching the polarity of the voltage in accordance with the direction instruction signal derived from the controller 20, and a current amplifier/limiter 36 which converts a voltage outputted from the direction-switching means 34 into a corresponding current and which limits the current with reference to the preset reference current $I_{MAX}$ (threshold value).

The driver 18 further includes a current sensor (current-detecting means) 38 which is provided on the downstream side of the current amplifier/limiter 36 and which detects the current to be supplied to the rotary driving source 12, and a current loop 40 which feeds back a detection signal from the current sensor 38 to the upstream side of the current amplifier/limiter 36.

Figure 3:
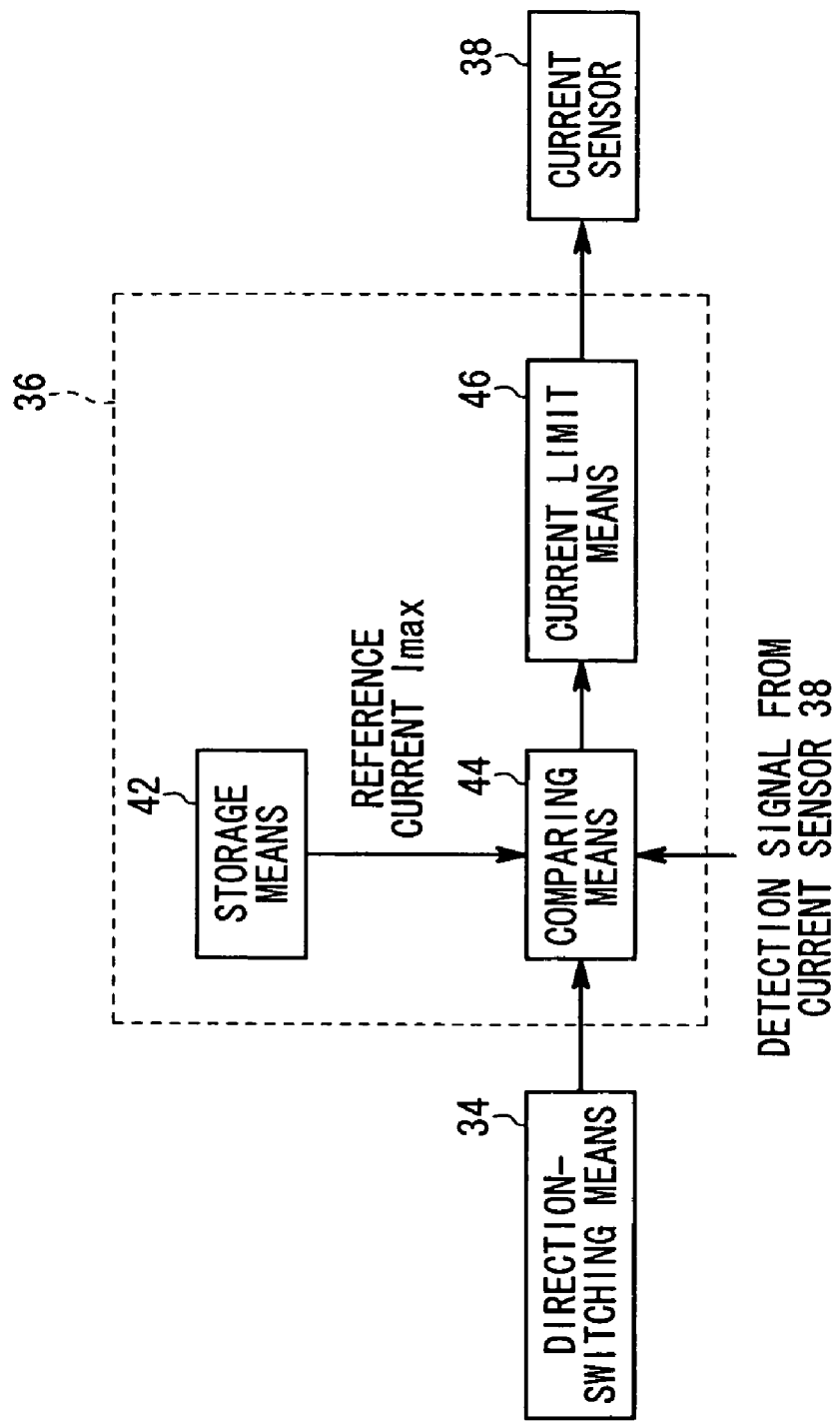
FIG. 3 is a block diagram illustrating an arrangement of a current amplifier/limiter shown in FIG. 2.

As shown in FIG. 3, the current amplifier/limiter 36 is provided with a comparing means 44 which compares the preset reference current $I_{MAX}$ stored in a storage means 42 with the detection signal of the current value supplied from the current sensor 38 via a detection line 41, and a current limit means 46 which limits the current to be supplied to the rotary driving source 12 so that the current does not exceed the reference current $I_{MAX}$, for example, when a high load is applied to the rotary driving source 12 and the current to be supplied to the rotary driving source 12 exceeds the reference current $I_{MAX}$.

The driver 18 has an unillustrated circuit board. For example, the current sensor 38 is preferably composed of a small resistor arranged on the circuit board. The driver 18 is connected to a power source 86 via a connector.

The control system 10 according to the embodiment of the present invention, into which the driver 18 is incorporated, is basically constructed as described above. Next, its operation, function, and effect will be explained.

At first, the direction instruction signal from the controller 20 is introduced into the driver 18. The driver 18 switches the rotation direction of the rotary driving source 12 into any one of the forward and backward directions by switching the polarity of the voltage based on the direction instruction signal. The voltage, which corresponds to the current supplied from the direction-switching means 34 to the rotary driving source 12, is inputted into the current amplifier/limiter 36.

The current amplifier/limiter 36 converts a voltage outputted from the direction-switching means 34 into a current which is supplied to the rotary driving source 12. Accordingly, the rotary driving source 12 is driven and rotated in the predetermined direction.

The rotary motion of the rotary driving source 12 is transmitted to the ball screw shaft 30 connected to the drive shaft of the rotary driving source 12. The rotary motion is converted into the rectilinear motion through screw engagement between the ball screw shaft 30 and the unillustrated ball screw nut. The rectilinear motion is transmitted to the slider 14. Therefore, for example, the rod 32 extends outside integrally with the slider 14 to press an unillustrated workpiece to a predetermined position.

When the workpiece is pressed at the predetermined position by the rod 32, and high load is applied to the rotary driving source 12, after the slider 14 reaches the stroke end, the rotation of the drive shaft of the rotary driving source 12 is stopped and restricted. In this situation, torque, which is outputted from the drive shaft of the rotary driving source 12, is proportional to the current applied to the rotary driving source 12. Therefore, when the rotary motion is restricted, the current (overcurrent), which exceeds the predetermined value, may be undesirably applied to the rotary driving source 12, causing burnout of the rotary driving source 12.

Figure 4:
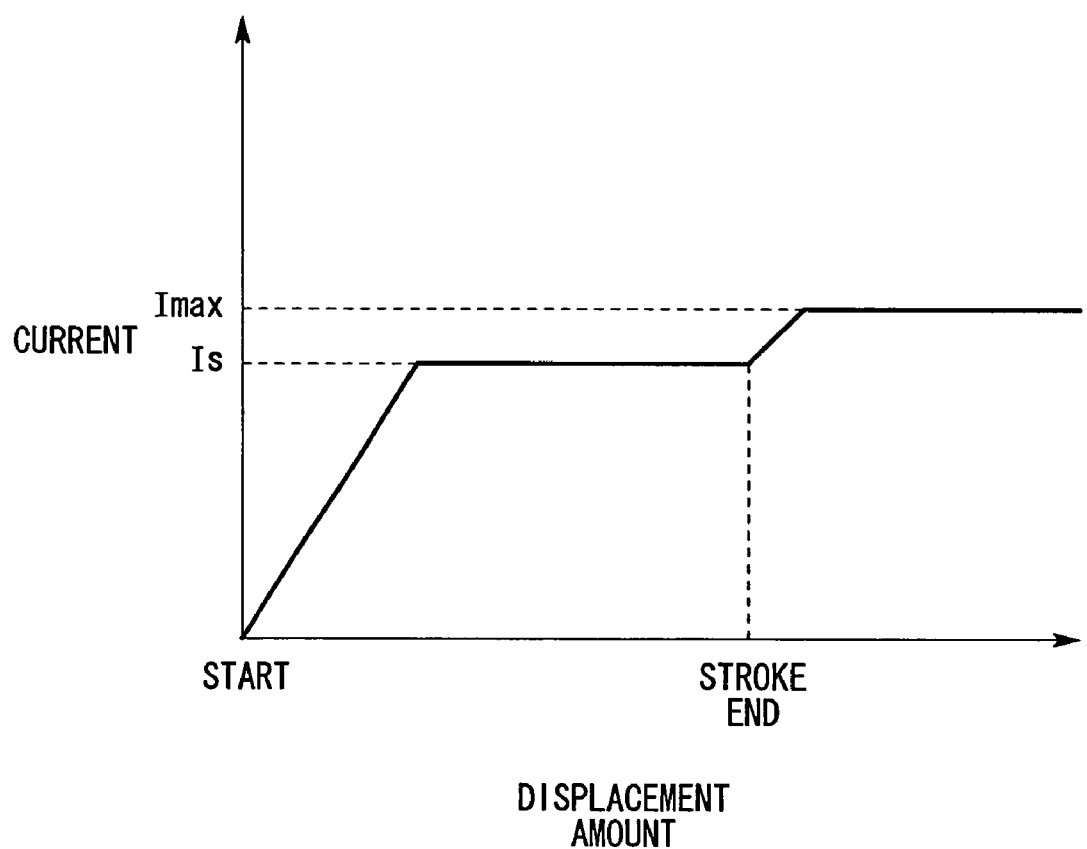
FIG. 4 is a characteristics chart illustrating the relationship between a displacement amount of a slider of the electric actuator and a current supplied to a rotary driving source.

Accordingly, in the embodiment of the present invention, the detection signal from the current sensor 38 for detecting the current to be supplied to the rotary driving source 12 is introduced into the current amplifier/limiter 36 via the detection line 41. The current amplifier/limiter 36 compares the detection signal from the current sensor 38 with the preset reference current $I_{MAX}$ stored in the storage means 42 by the comparing means 44. Further, the current to be supplied to the rotary driving source 12, is limited not to exceed the reference current $I_{MAX}$ by the current limit means 46 (see FIG. 4).

As described above, in the embodiment of the present invention, the value of current to be supplied to the rotary driving source 12 is checked by the current sensor 38, and then the current amplifier/limiter 36 limits the current applied to the rotary driving source 12 to be equal to or lower than the reference current $I_{MAX}$. As a result, even when the high load is applied to the rotary driving source 12, and the drive shaft of the rotary driving source 12 in an ON state is stopped and restricted, the rotary driving source 12 can be prevented from being burnt out due to overcurrent, because the current supplied to the rotary driving source 12 is limited not to exceed the preset reference current $I_{MAX}$. The torque, of course, can be controlled by limiting the current applied to the rotary driving source 12.

In the embodiment of the present invention, it is unnecessary to provide a detector such as an encoder and a resolver, and a control circuit to control operation speed and position of the slider 14. The rotary driving source 12 can be prevented from being burnt out by using a simple circuit such as the current amplifier/limiter 36, making it possible to reduce production cost.

In this arrangement, it is preferable that the driver 18 is applied to the driving apparatus (electric actuator) in which only the pressing action by the rod 32 and the rotation direction of the rotary driving source 12 are controlled.

Though not restrictive, the present invention has been explained based on the embodiment where a workpiece is pressed by the rod 32 of the electric actuator 16, and applicable, for example, to transporting, caulking, pushing or supporting the workpiece by the rod 32 of the electric actuator 16, to grip the workpiece by an unillustrated electric chuck, or to clamp the workpiece by an electric clamp as described later on.

FIGS. 7 to 17 show modified embodiments of the electric actuator 16. In the modified embodiments, the same components as those of the embodiment described above are designated by the same reference numerals, and detailed explanation thereof will be omitted.

Figure 7:
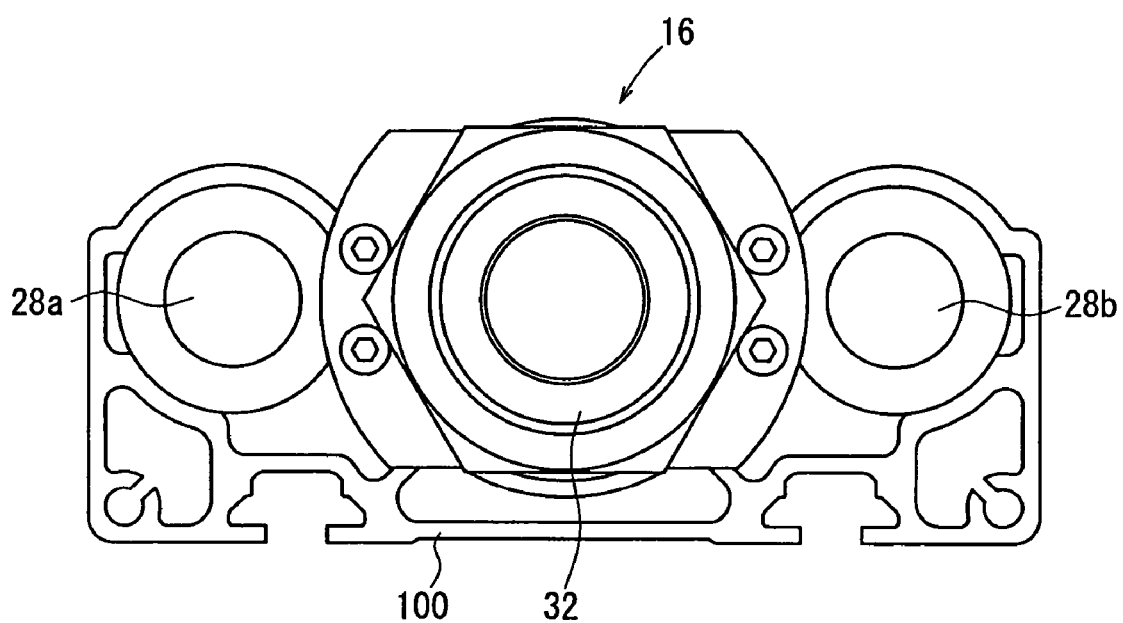
FIG. 7 is a side view illustrating a modified embodiment of an electric actuator.

In the modified embodiment shown in FIG. 7, the guide shafts 28a, 28b are surrounded by a frame 100 made of light alloy such as aluminum, in the electric actuator 16, to guide the slider 14 more accurately.

Figure 8:
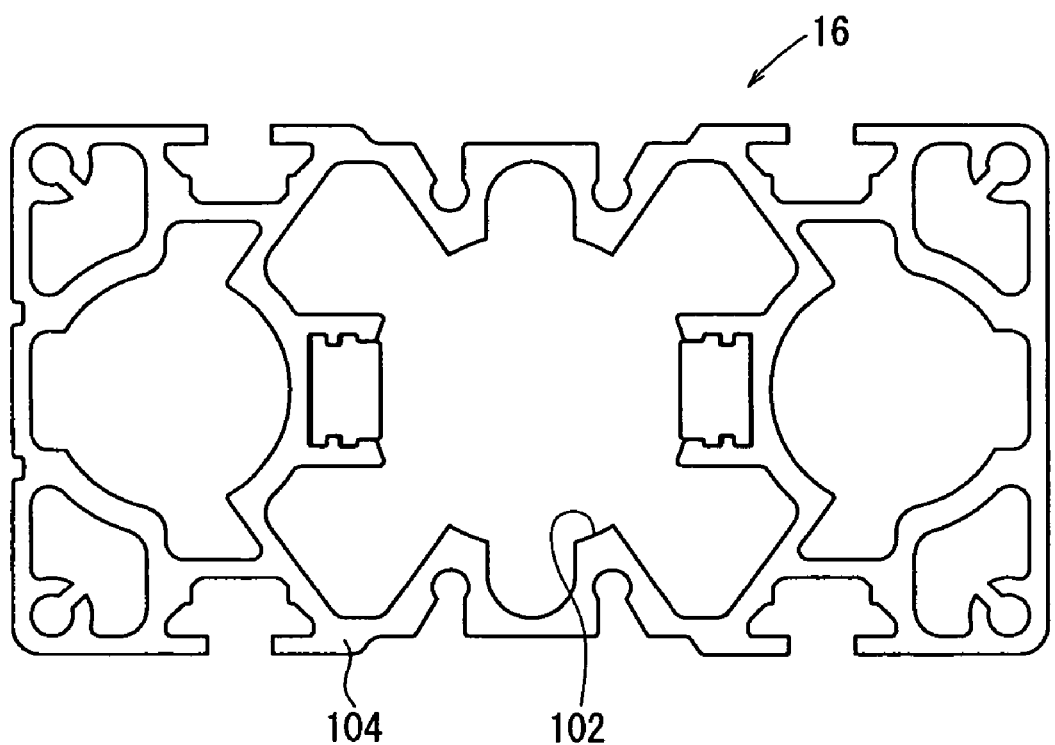
FIG. 8 is a side view illustrating a frame of an electric actuator.

In the modified embodiment shown in FIG. 8, the electric actuator 16 is provided with a frame 104 formed with a space 102 for accommodating the rotary driving source 12 and surrounding the guide shafts 28a, 28b. The frame 104 can be thin-walled to have a light weight with enhanced rigidity.

Figure 9:
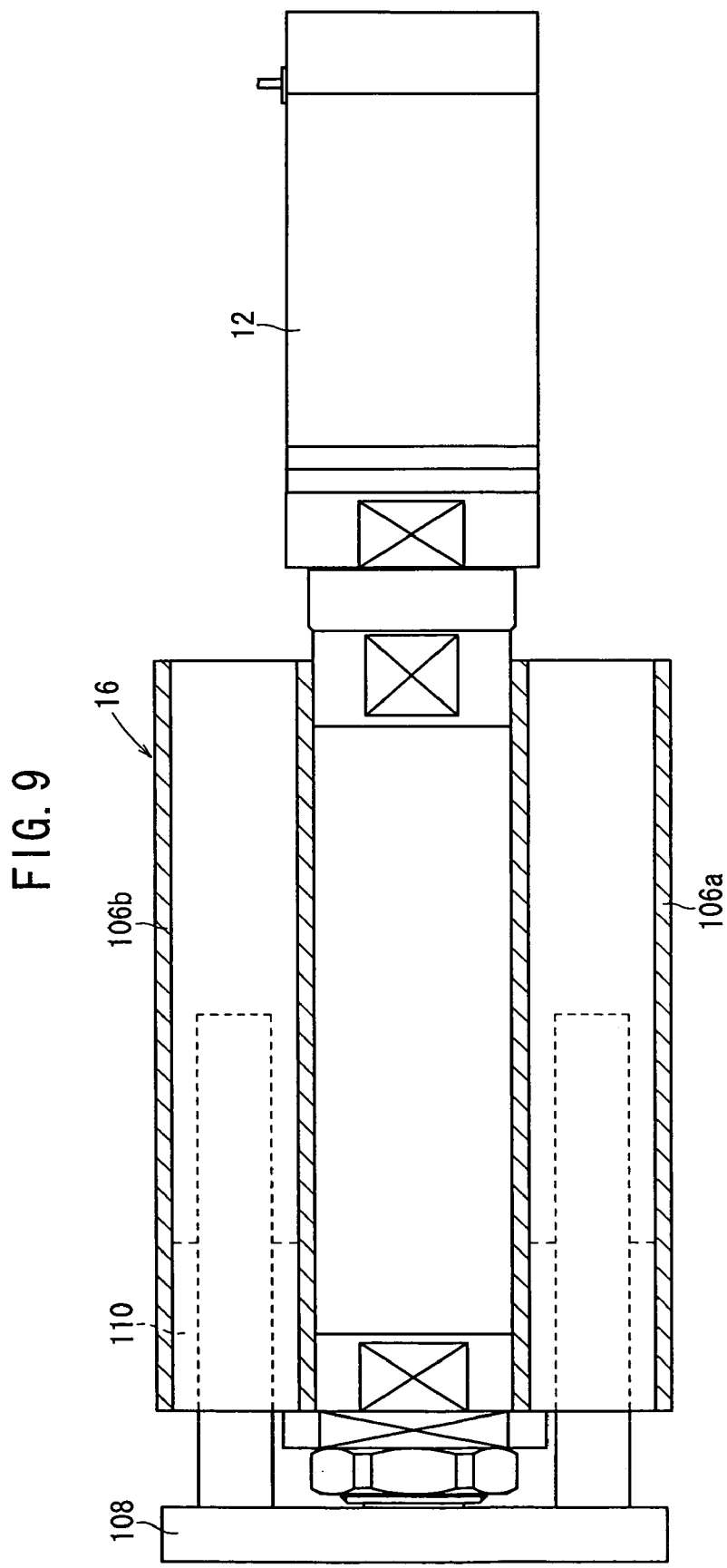
FIG. 9 is a partially cross-sectional plan view illustrating a modified embodiment of an electric actuator.

In the modified embodiment shown in FIG. 9, the electric actuator 16 is provided with guide units 106a, 106b for guiding the guide shafts 28a, 28b, and tip ends of the guide shafts 28a, 28b are connected to one another via a plate 108. Further, bushes 110 are provided in the guide units 106a, 106b.

Figure 10:
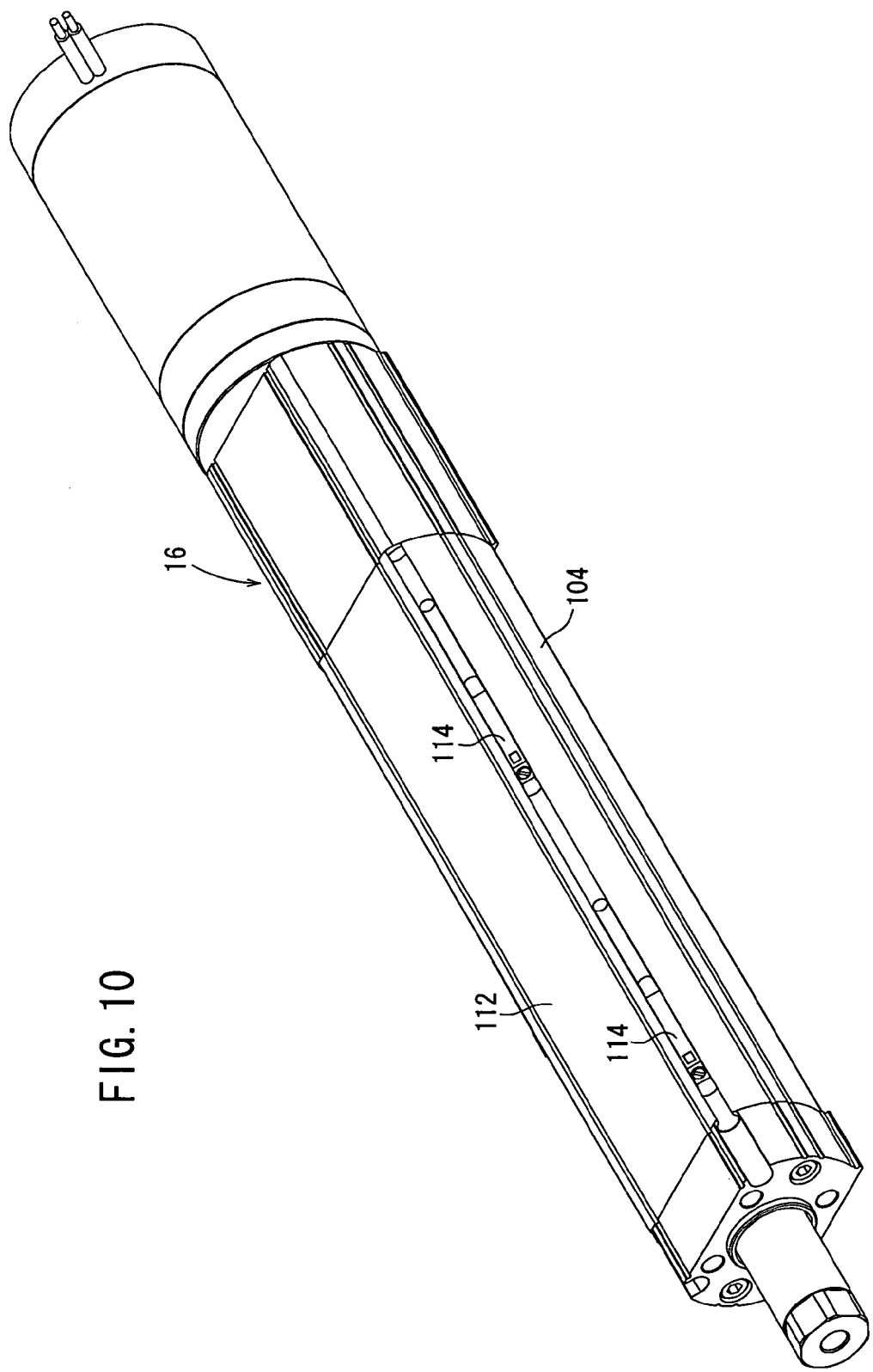
FIG. 10 is a perspective view illustrating a modified embodiment of an electric actuator to which a cover is attached.

In the modified embodiment shown in FIG. 10, a cover 112 is attached to the electric actuator 16 whose rigidity is enhanced by the frame 104 as described above. A pair of sensors 114, 114 are provided in a groove of the cover 112 in order to detect the position of the slider 14. Those usable as the sensor 114 include various sensors such as magnetic sensors, proximity sensors, and photo-micro sensors.

Figure 11:
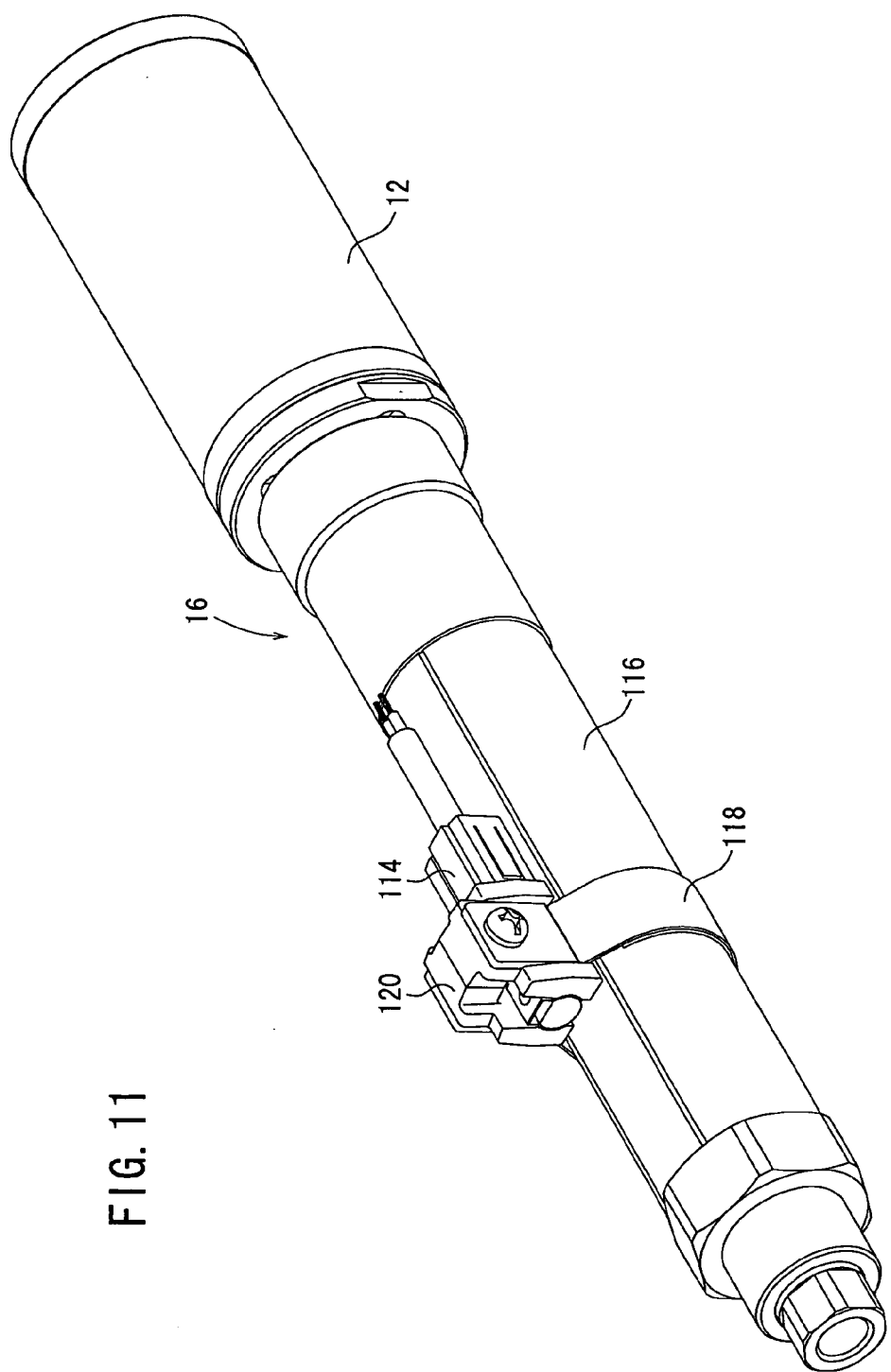
FIG. 11 is a perspective view illustrating a modified embodiment of an electric actuator equipped with a sensor by a holder.

The modified embodiment shown in FIG. 11 relates to the modified embodiment shown in FIG. 9, in which a holder 120 is attached to a cover 116 having a circular cross section by a band 118. The sensor 114 is retained by the holder 120.

Figure 12:
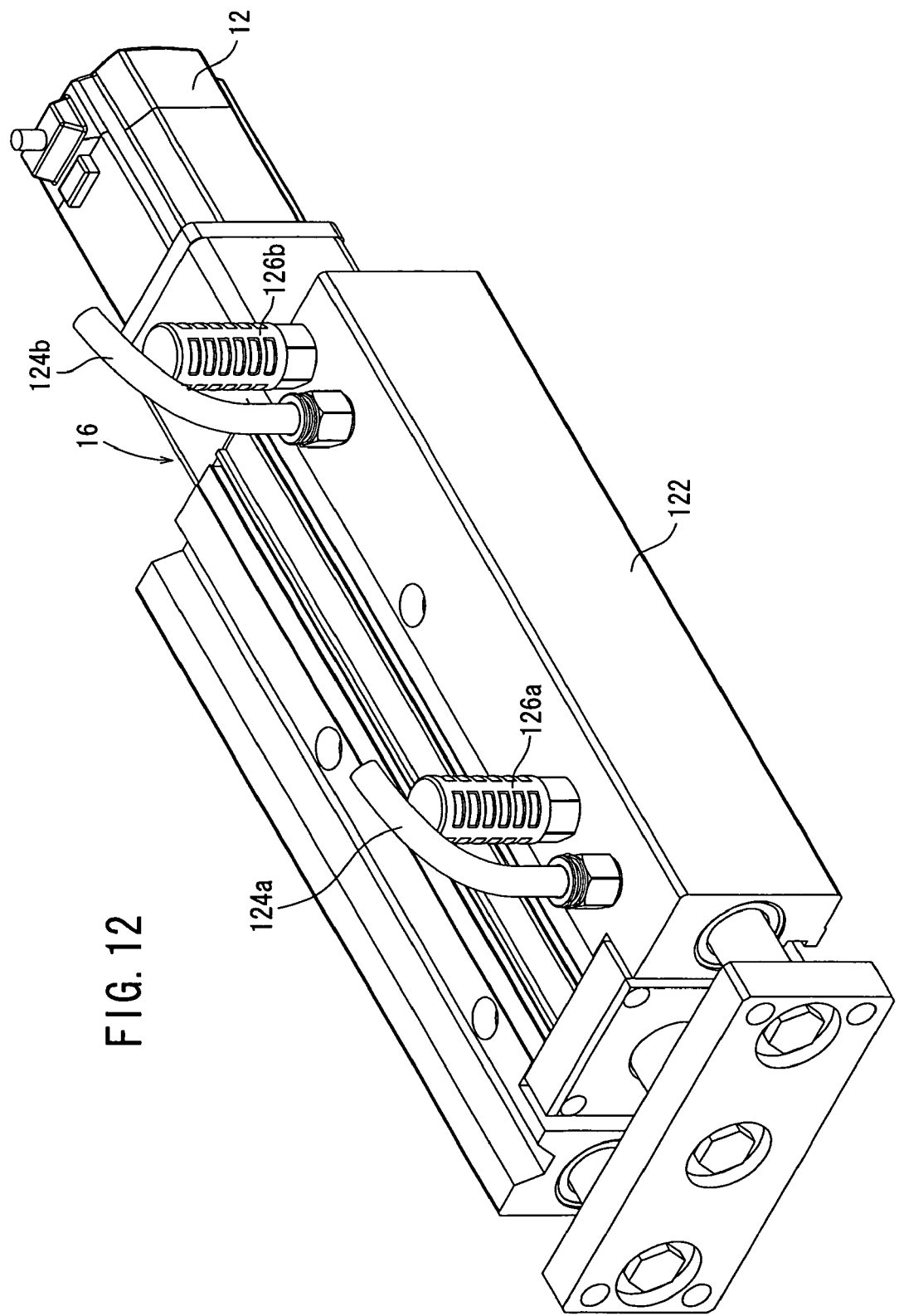
FIG. 12 is a perspective view illustrating a modified embodiment in which an electric actuator and an actuator utilizing compressed air are used in combination.

The modified embodiment shown in FIG. 12 relates to such an arrangement that an actuator 122 utilizing compressed air is further provided with the electric actuator 16 using the rotary driving source 12. Air pipes 124a, 124b are connected to the actuator 122. Silencers 126a, 126b are provided closely to the pipes 124a, 124b in order to make soundproof when the compressed air is discharged.

Figure 13:
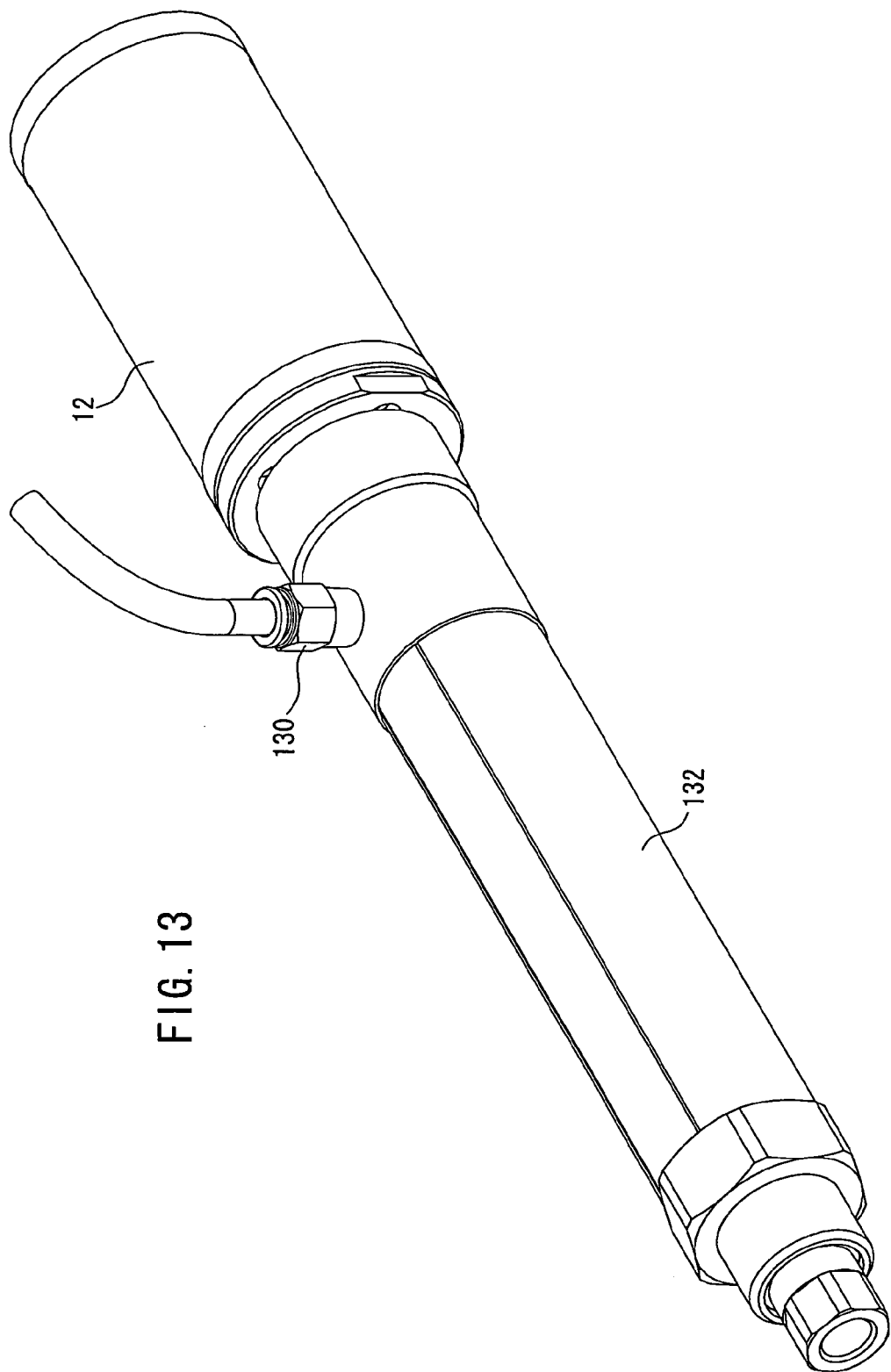
FIG. 13 is a perspective view illustrating a modified embodiment of an electric actuator to which a vacuum port is connected.
Figure 14:
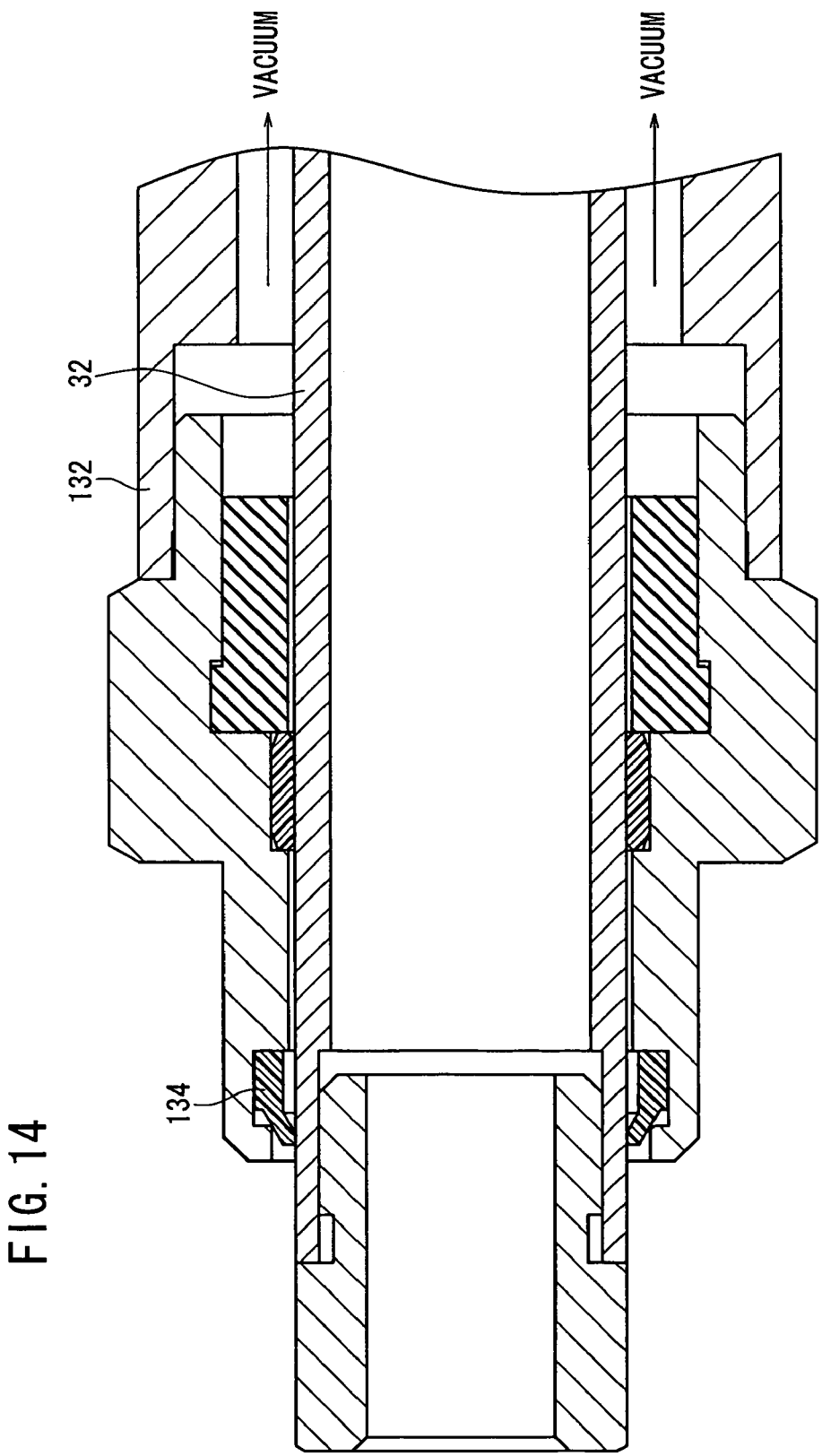
FIG. 14 is a partial magnified longitudinal sectional view illustrating a dust seal provided for the electric actuator shown in FIG. 13.

The modified embodiment shown in FIG. 13 is constructed as follows. That is, a vacuum port 130 is connected to the electric actuator 16 to obtain a vacuum state in the space between the rod 32 and a cover 132 surrounding the rod 32 to remove dust which may be generated during the sliding movement of the rod 32. A dust seal 134, which contacts and presses the circumferential wall surface of the rod 32, may be provided at the tip end of the cover 132 as well (see FIG. 14).

Figure 15:
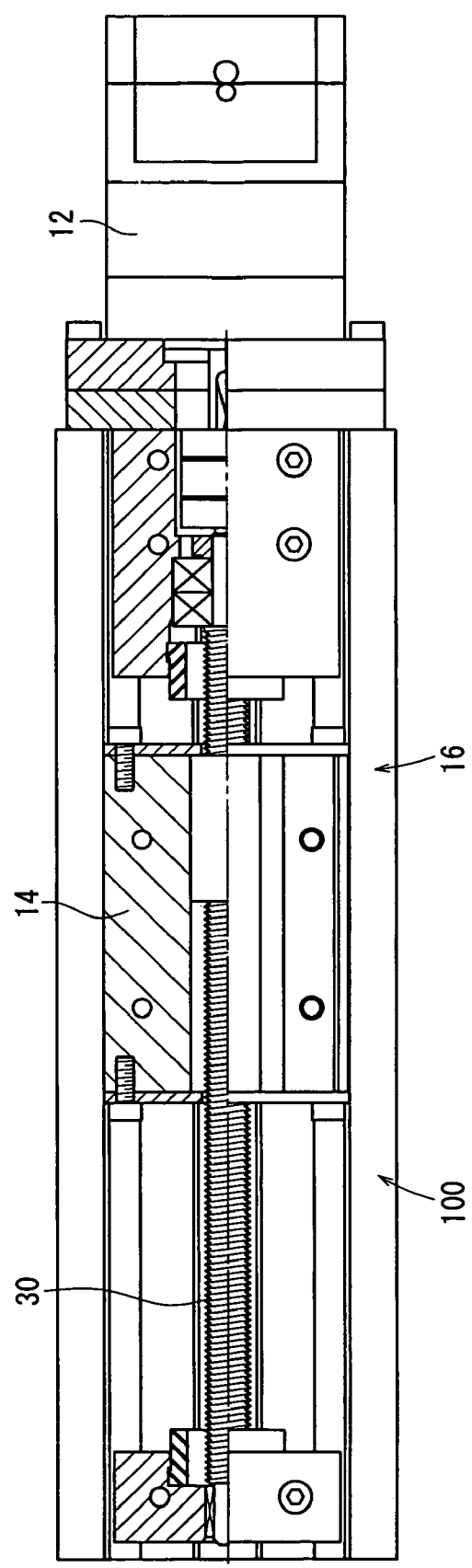
FIG. 15 is a partially cross-sectional plan view illustrating a modified embodiment of an electric actuator having a resin needle shaft between a frame and a slider.
Figure 16:
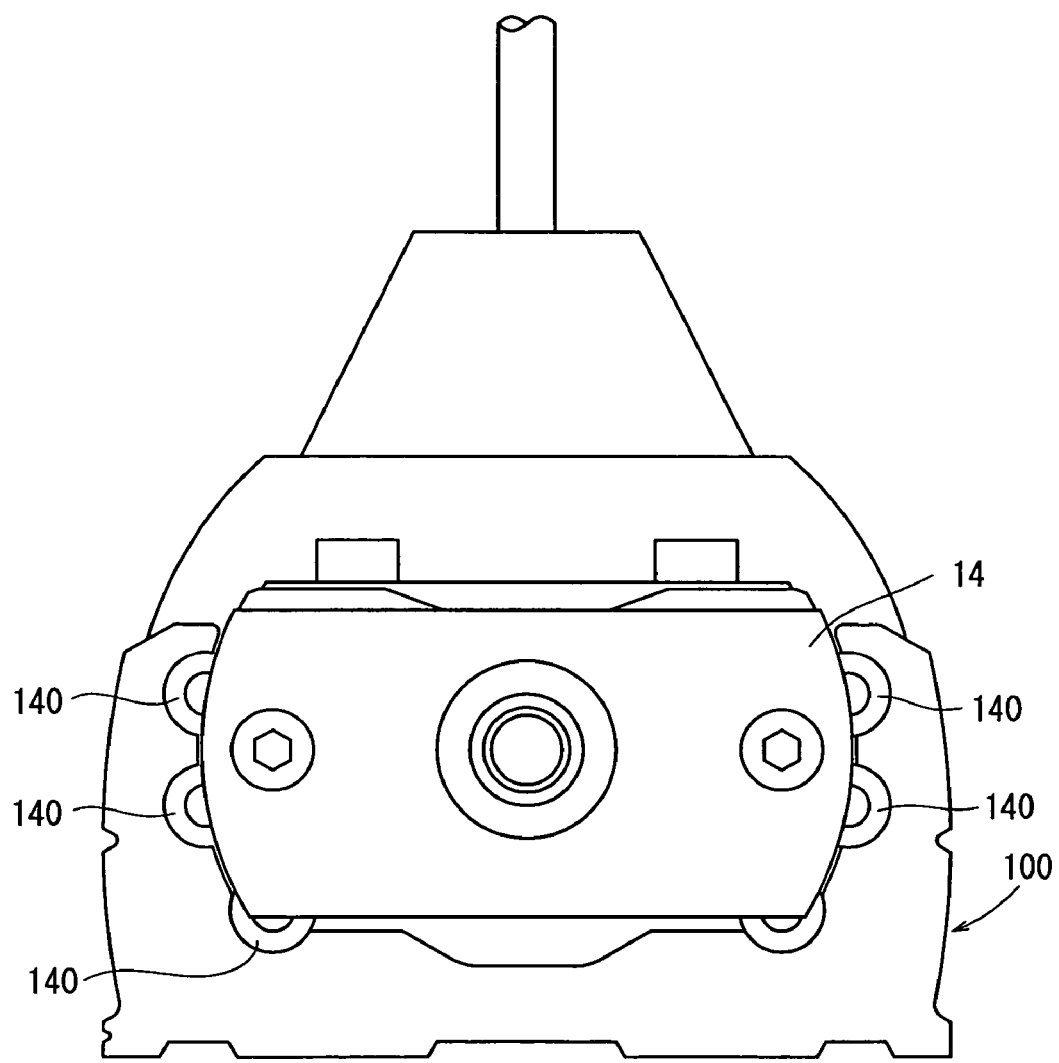
FIG. 16 is a front view illustrating a modified embodiment of an electric actuator.

The modified embodiment shown in FIGS. 15 and 16 is constructed as follows. That is, a plurality of needle shafts 140 made of resin, preferably three on one side and six in total on both sides, extend in the axial direction between the frame 100 and the slider 14 in the electric actuator 16 in place of the guide shafts 28a, 28b. Such an electric actuator 16 can be produced more inexpensively.

In each of the modified embodiments shown in FIGS. 7 to 16 described above, the rod 32 moves forward and backward two-dimensionally. However, a plurality of the electric actuators 16 can be combined three-dimensionally to perform the three-dimensional action. Such an arrangement is shown in FIG. 17.

Figure 17:
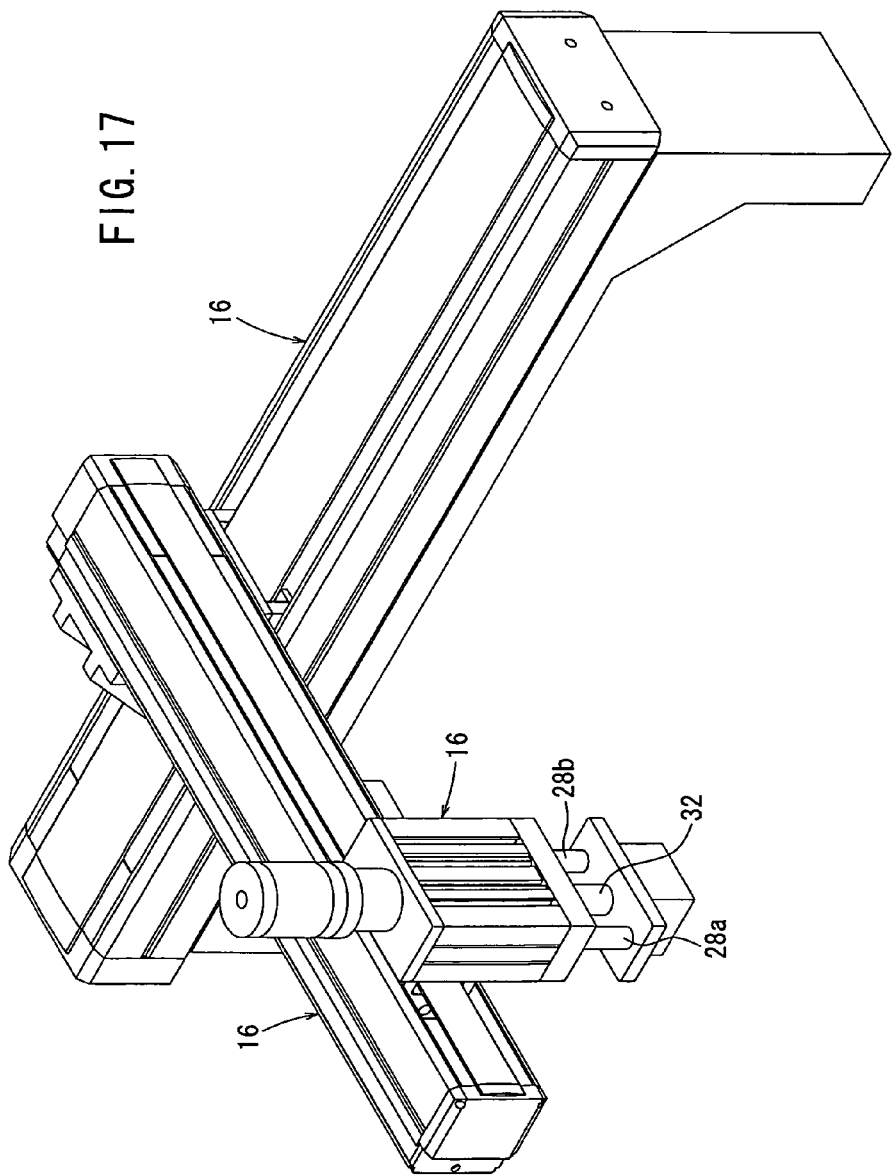
FIG. 17 is a perspective view illustrating a state in which electric actuators are assembled along with the three axes of X, Y, and Z.

In the modified embodiment shown in FIG. 17, the electric actuators 16 are attached along the X axis, the Y axis, and the Z axis, respectively, to make the rod 32 of the electric actuator 16 for the Z axis move three-dimensionally from a big point of view.

That is, when a high load is applied to the rotary driving source 12 as a result of, for example, the workpiece-transporting operation, the workpiece-gripping operation, or the clamping operation as described above, and the rotation of the drive shaft of the rotary driving source 12 is stopped and restricted, the current to be supplied to the rotary driving source 12 is limited not to exceed the reference current $I_{MAX}$.

Next, an explanation will be made about Comparative Example 1 and Comparative Example 2 to be compared with the embodiments of the present invention. The same components as those of the embodiments of the present invention are designated by the same reference numerals, and detailed explanation thereof will be omitted.

Figure 5:
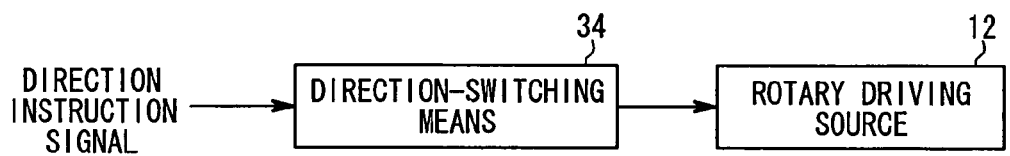
FIG. 5 is a block diagram illustrating an arrangement of a relay circuit concerning Comparative Example 1.

FIG. 5 shows a relay circuit 50 concerning Comparative Example 1. In this arrangement, when a plurality of the relay circuits 50 are combined, it is possible to switch the direction of rotation of the rotary driving source 12. However, when the drive shaft of the rotary driving source 12 is stopped and restricted, current exceeding capacity of the rotary driving source 12 may be supplied and cause burnout thereof.

Figure 6:
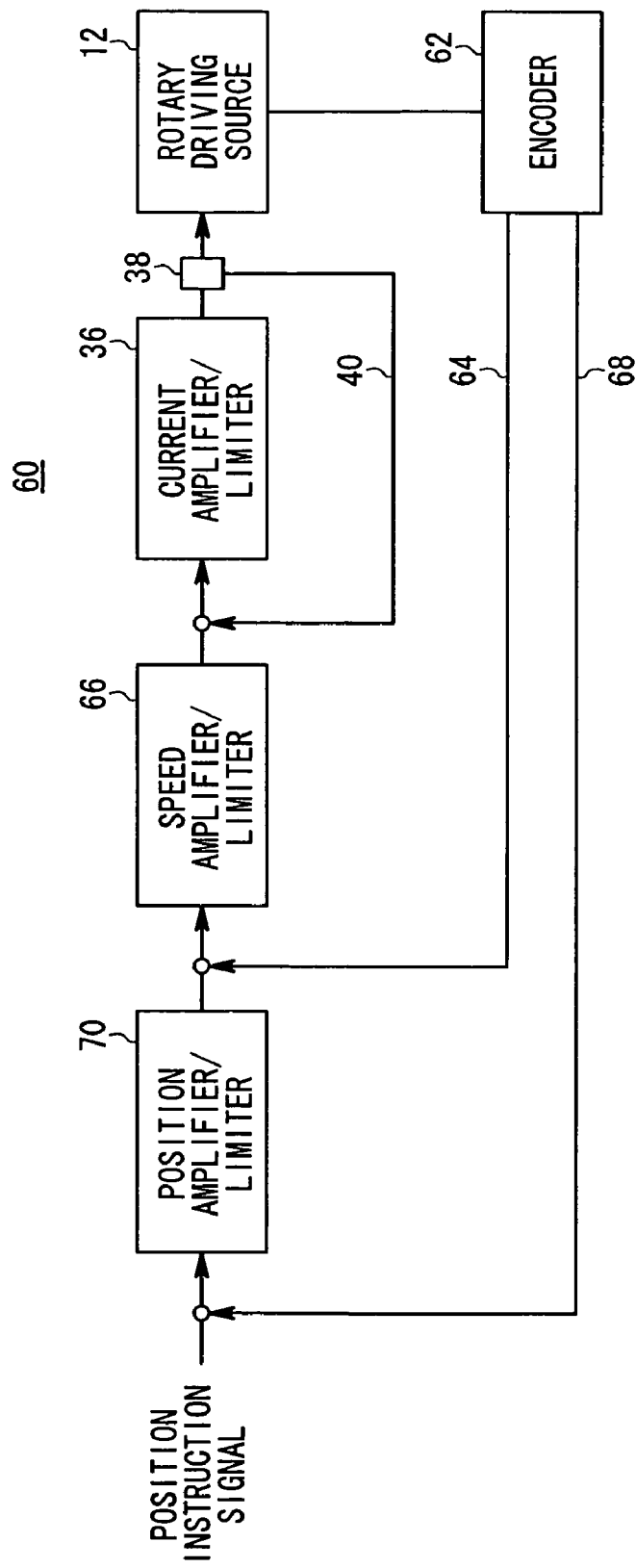
FIG. 6 is a block diagram illustrating an arrangement of a servo circuit concerning Comparative Example 2.

FIG. 6 shows a servo circuit 60 concerning Comparative Example 2. The servo circuit 60 has a detector such as a resolver and an encoder 62, comprising a control circuit for feedback-controlling speed by a speed loop 64 and a speed amplifier/limiter 66, and a control circuit for positioning by a position loop 68 and a position amplifier/limiter 70. Therefore, the servo circuit 60 concerning Comparative Example 2 requires highly accurate control circuits for controlling, for example, the position and the speed. Therefore, the servo circuit 60 is expensive, and the production cost becomes high.

On the contrary, the embodiment of the present invention makes it possible to incorporate part of functions of the relay circuit 50 concerning Comparative Example 1 and the servo circuit 60 concerning Comparative Example 2 at a low cost. Further, in the embodiment of the present invention, the electric actuator 16 can be operated in accordance with the ON/OFF control in the same manner as the solenoid-operated valve, and thus the electric actuator 16 can be used as a direction-controlling apparatus optimally, for example, for pressing, transporting, etc. Further, in the embodiment of the present invention, it is unnecessary to provide a detector such as an encoder additionally provided outside the rotary driving source 12. Therefore, it is possible to reduce size and weight.

Figure 18:
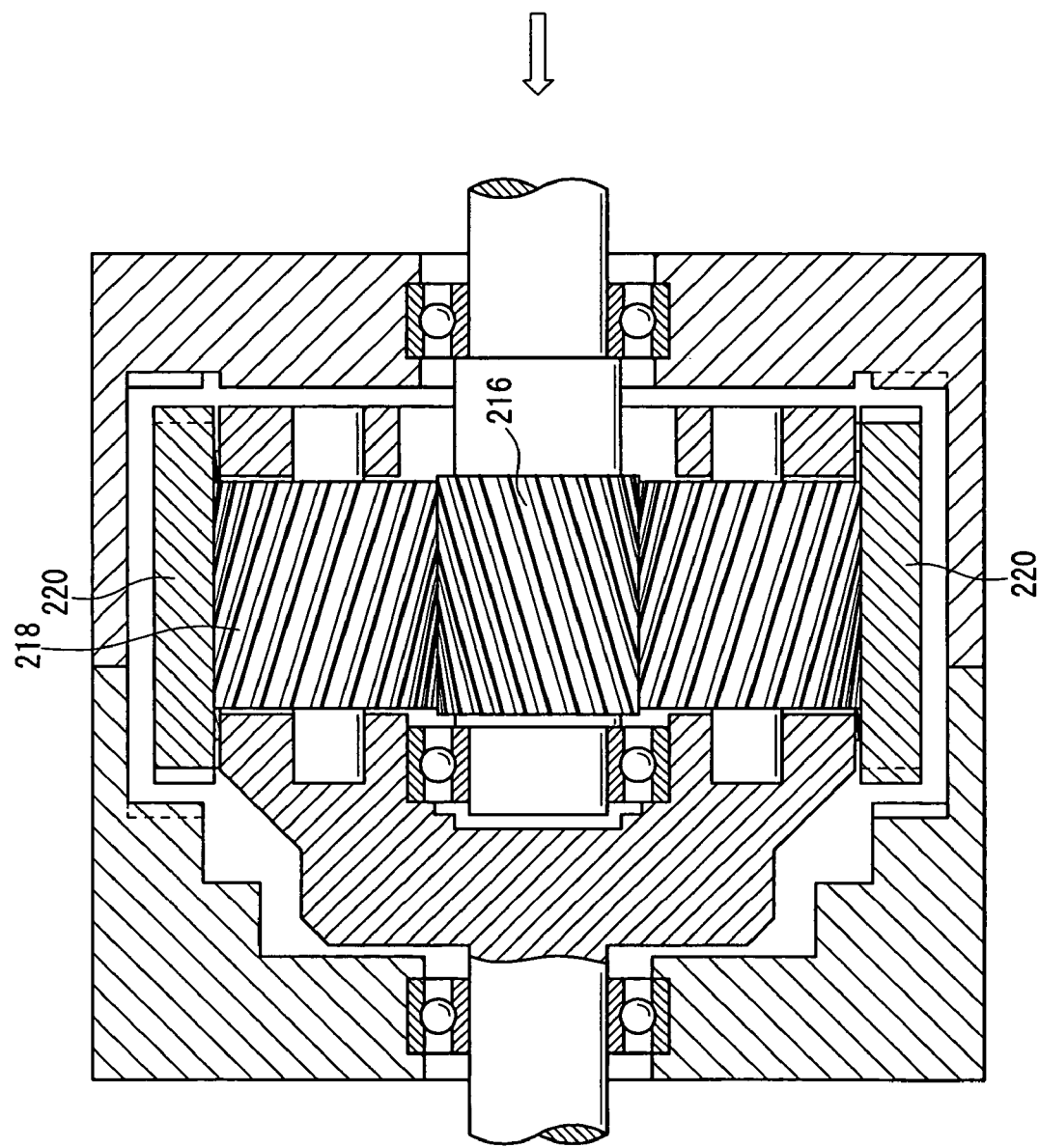
FIG. 18 is a longitudinal sectional view, which is taken in the axial direction, illustrating an apparatus for automatically switching speed reducing ratio proposed by SMC KABUSHIKI KAISHA.

In the embodiment described above, the relationship between the rotary driving source 12 and the ball screw shaft 30 is not explained in detail. Of course, the both may be directly connected to one another. However, a mechanism for switching speed reducing ratio may also be interposed therebetween. As for such a speed reducing ratio-switching mechanism, SMC KABUSHIKI KAISHA has proposed "an apparatus for automatically switching speed reducing ratio" as Japanese Patent Application No. 2004-170263. With reference thereto in this application, as shown in FIG. 18, helical gears are used as a sun gear 216, planet gears 218, and an internal gear 220. Accordingly, when a load, which exceeds a predetermined torque, is applied to the internal gear 220, the internal gear 220 is moved in the direction toward the input shaft or the direction toward the output shaft, while being rotated in the direction different from that of the sun gear 216, and thus the speed reducing ratio is automatically switched.

Figure 19A:
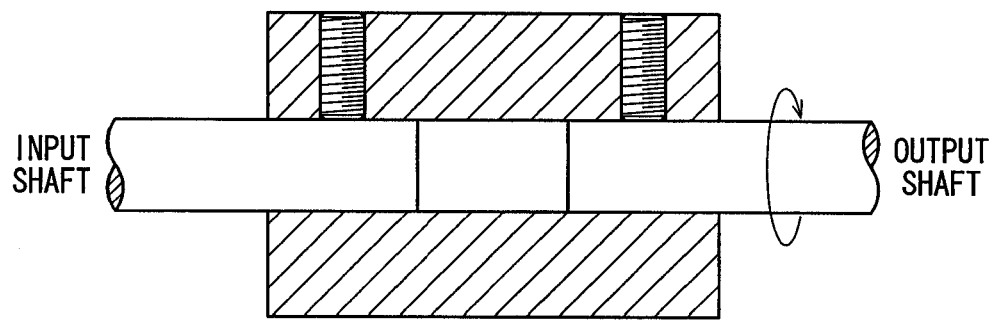
FIGS. 19A to 19C are sectional views illustrating connections between input shafts and output shafts in the apparatus for automatically switching speed reducing ratio, respectively.
Figure 19B:
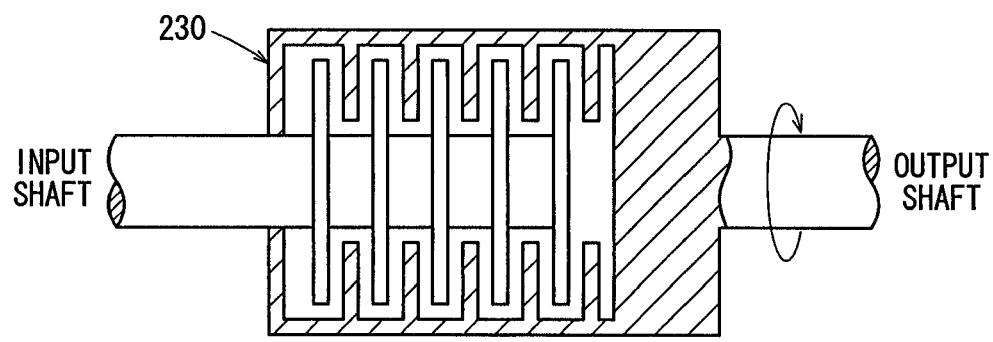
Figure 19C:
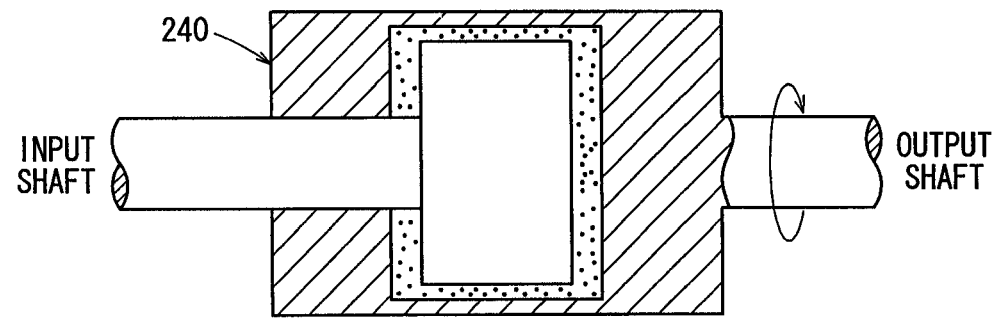

Various embodiments are also conceived in relation to the direct connection between the rotary driving source 12 and the ball screw shaft 30 as described above. In FIG. 19A, the output shaft, i.e., the input shaft of the ball screw shaft 30 is directly connected to the input shaft, i.e., the output shaft of the rotary driving source 12. In FIG. 19B, a viscous coupling 230 is interposed between the input shaft and the output shaft. In FIG. 19C, a powder clutch 240 is interposed between the input shaft and the output shaft.

Figure 20A:
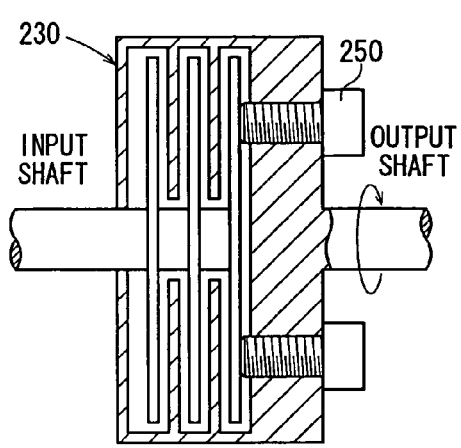
FIGS. 20A to 20D are sectional views illustrating situations in which various mechanisms are provided between input shafts and output shafts in the apparatus for automatically switching speed reducing ratio, respectively.

As shown in FIG. 20A, even in an arrangement in which the viscous coupling 230 is interposed, fluid resistance can be increased/decreased by screwing an adjusting screw 250 to press one disk disposed on the side of the output shaft in order to adjust the rotational force of the rotary driving source 12.

Figure 20B:
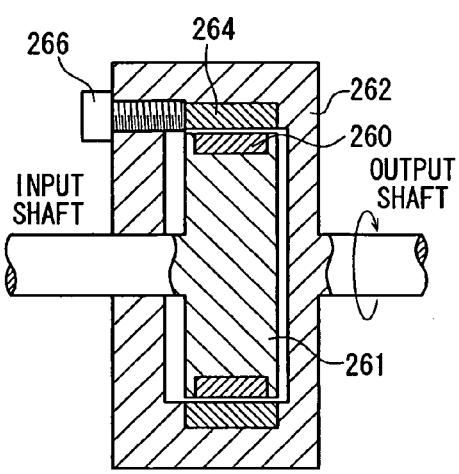
Figure 20C:
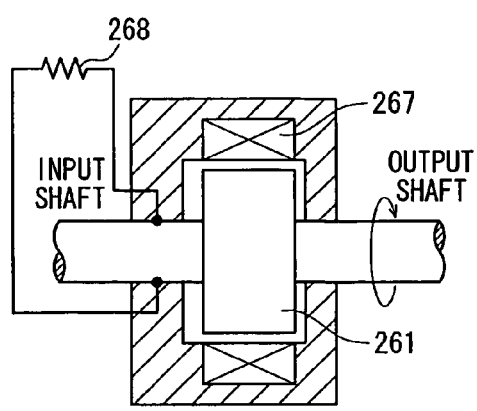
Figure 20D:
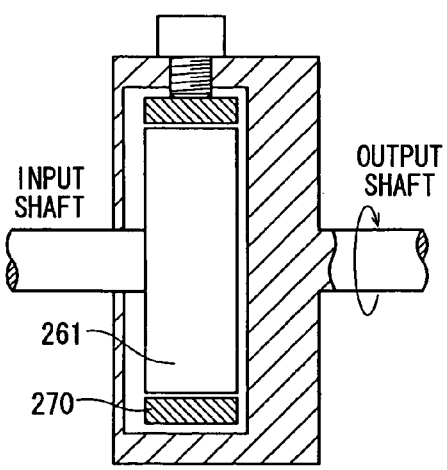

In an arrangement shown in FIG. 20B, a magnet 260 is provided for a rotor 261 between the input shaft and the output shaft. A plate member 264 made of aluminum or copper is attached inside a casing 262. The plate member 264 is moved back and forth by an adjusting screw 266 to make rotational resistance variable by changing magnetic fluxes of the magnet 260. In an arrangement shown in FIG. 20C, a coil 267 is attached around a rotor 261. A resistance value of a resistor 268 is changed with respect to the coil 267 in order to control the rotation of the rotor 261. As shown in FIG. 20D, a rotor 261 may be simply tightened by a brake 270 to control ON/OFF of the rotation of the rotor 261.

Figure 21:
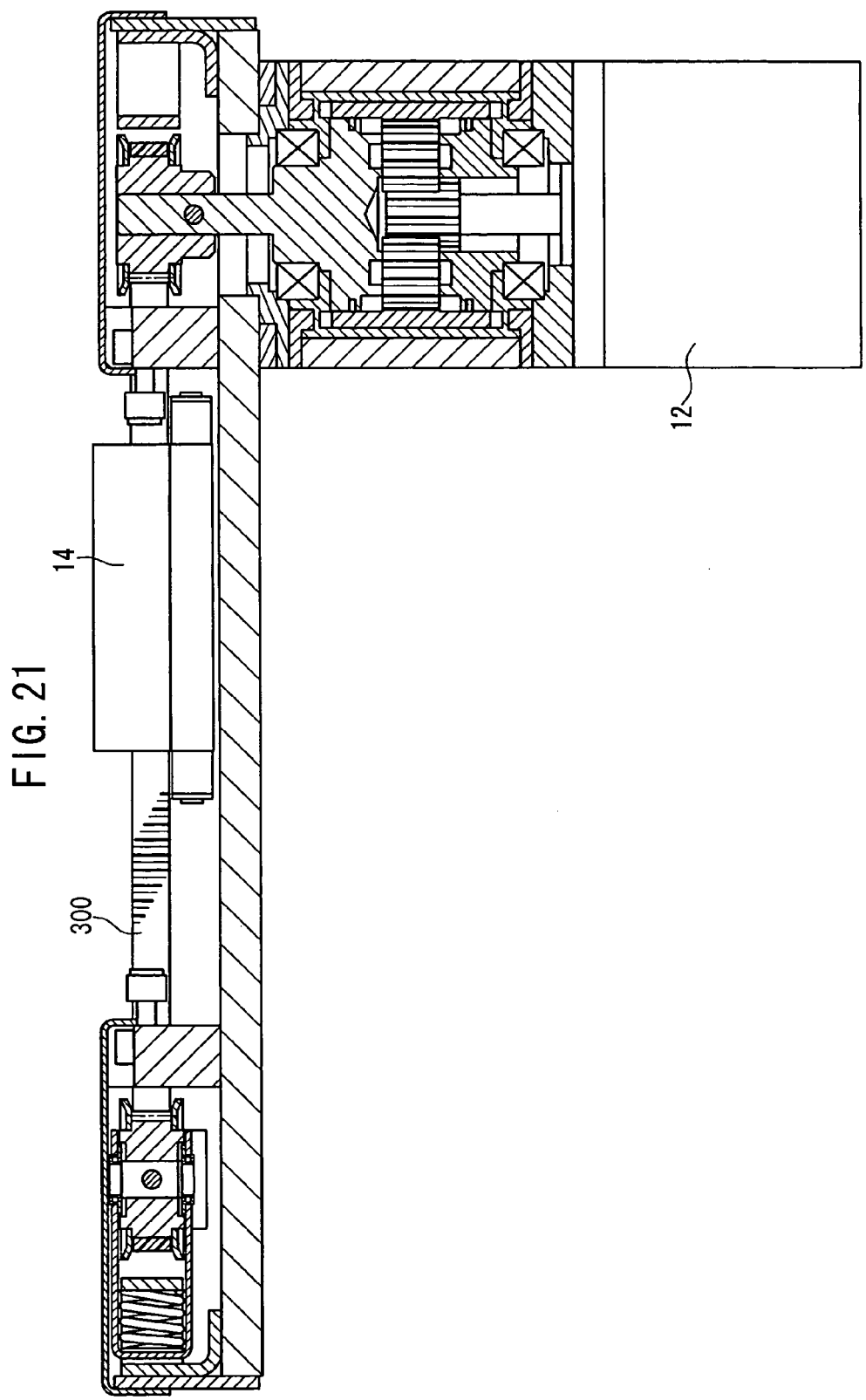
FIG. 21 is a partial longitudinal sectional view illustrating a state in which a slider is displaced by means of a belt.

In the embodiment described above, the rotary driving source 12 and the slider 14 are connected to one another by the ball screw shaft 30 to transmit the rotational force of the rotary driving source 12. However, there is no limitation to the ball screw shaft 30 as described above. For example, as described in Japanese Laid-Open Patent Publication No. 2005-106284, the slider 14 may be displaced by a belt 300 (see FIG. 21).

Figure 22:
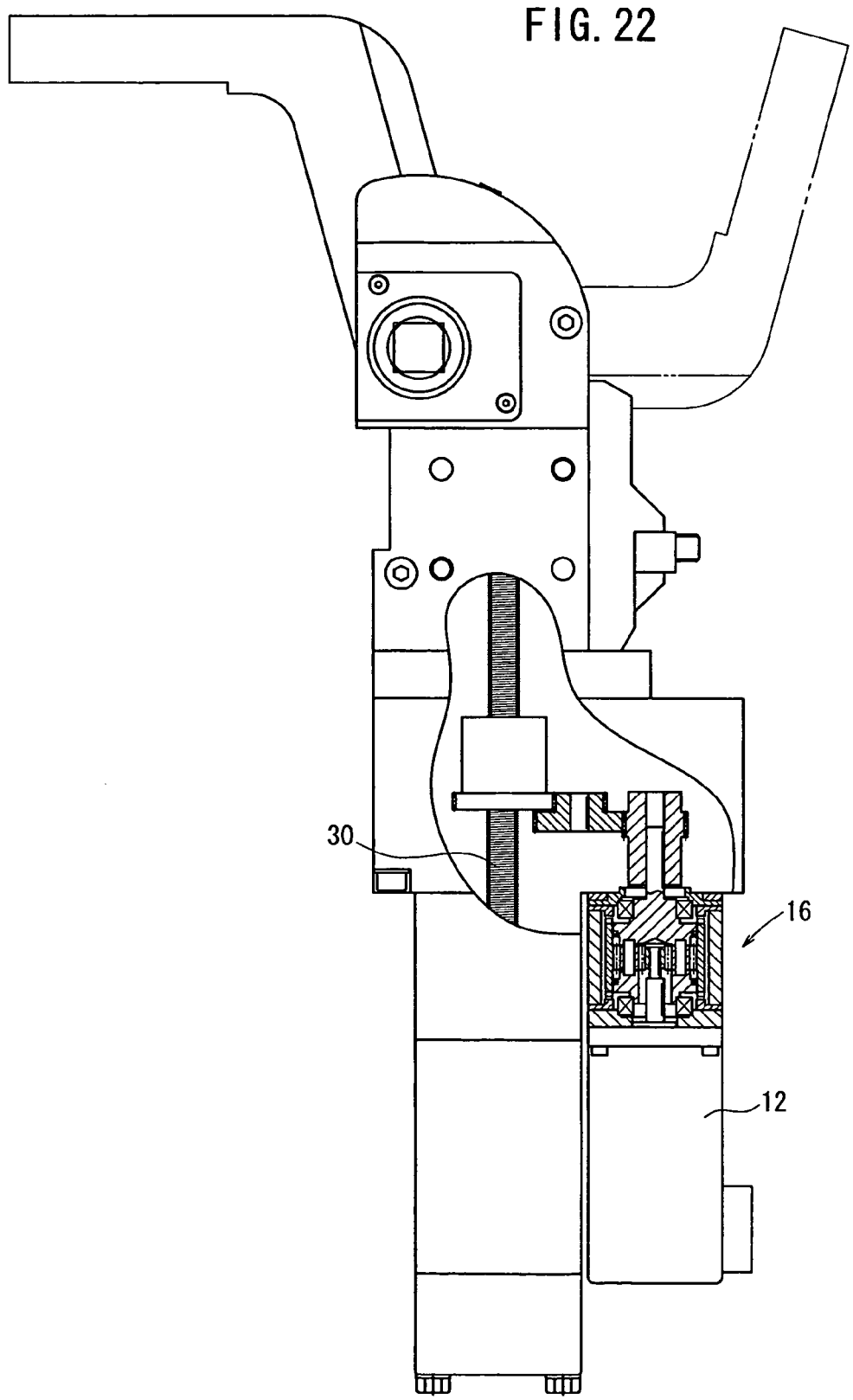
FIG. 22 is, with partial cutout, a side view illustrating an electric clamp apparatus.
Figure 23:
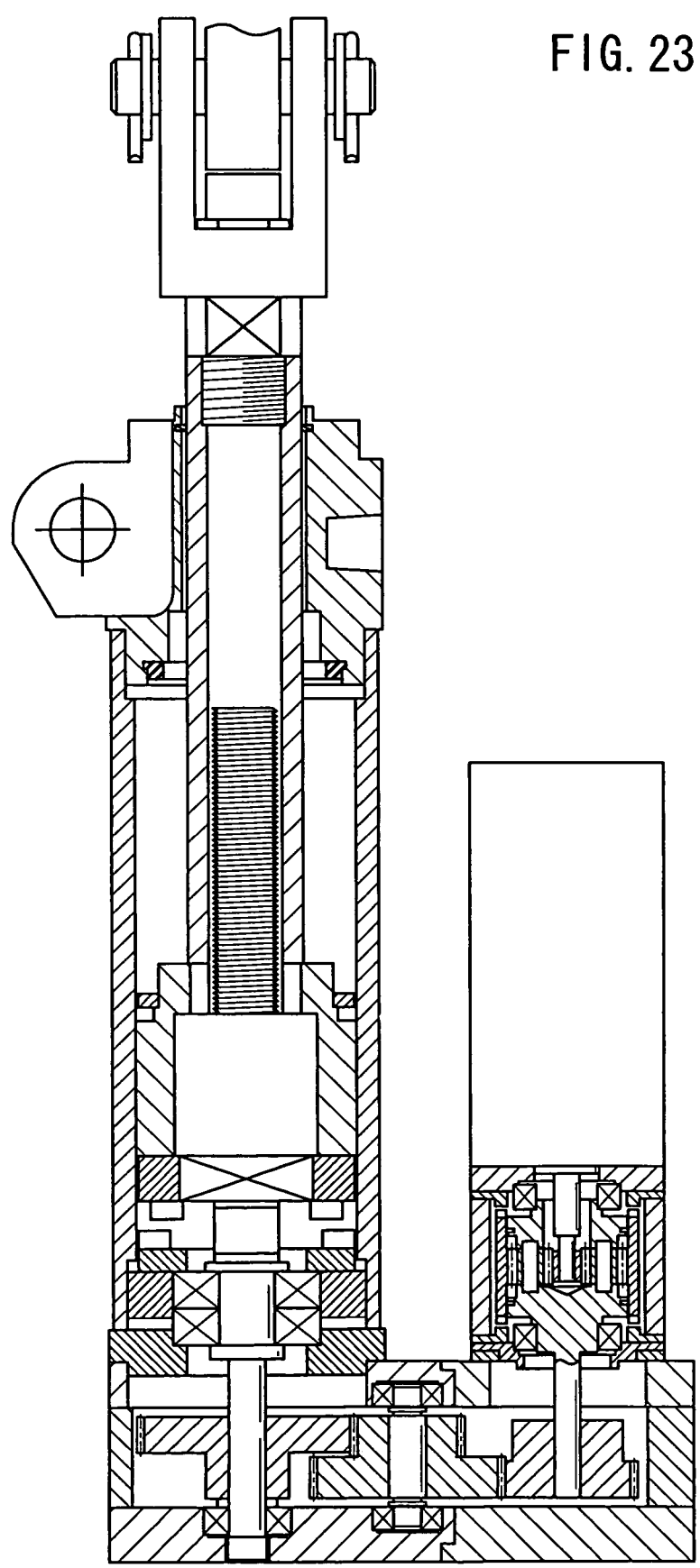
FIG. 23 is a vertical sectional view, which is taken in the axial direction, illustrating the electric clamp apparatus.
Figure 24:
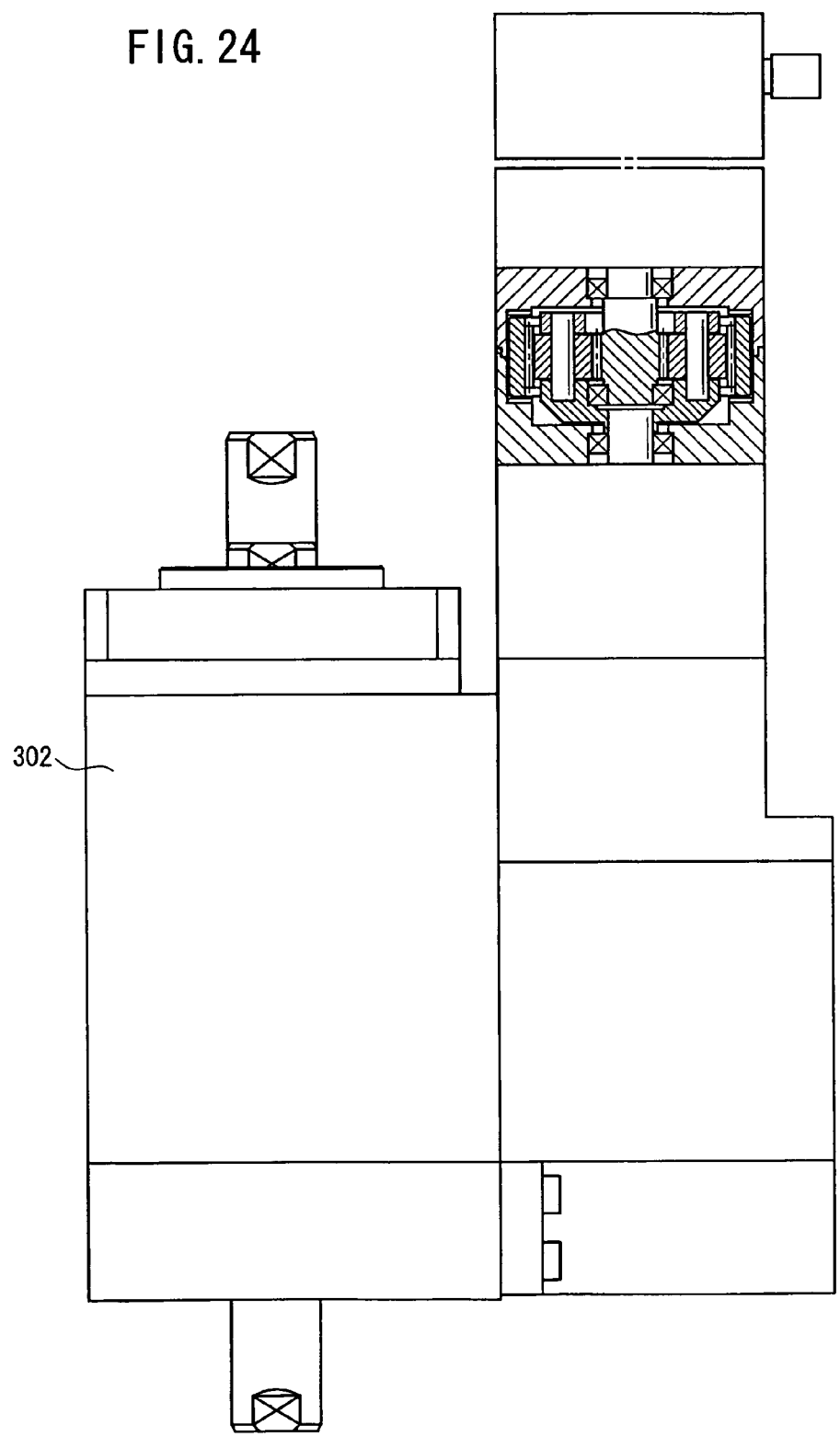
FIG. 24 is, with partial cutout, a side view illustrating a state in which a hydraulic cylinder is juxtaposed.

The present invention is also usable for structures in which a rotary driving source 12 and a ball screw shaft 30 are juxtaposed as in an electric clamp apparatus as shown in FIGS. 22 and 23 (Japanese Laid-Open Patent Publication Nos. 2001-105332 and 2002-219625), or a hydraulic cylinder 302 is juxtaposed (Japanese Laid-Open Patent Publication No. 2005-54862, see FIG. 24).

Figure 25:
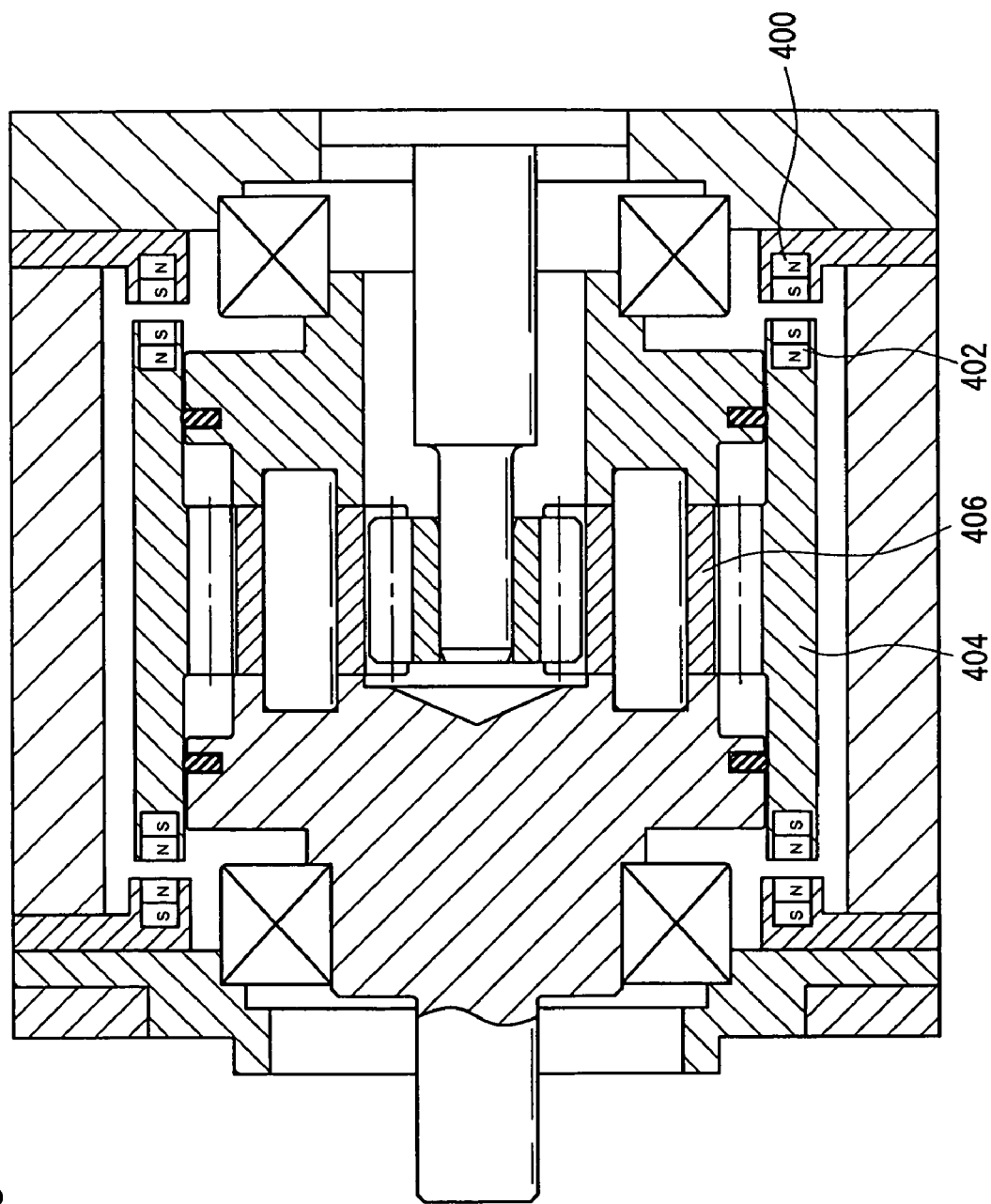
FIG. 25 is a longitudinal sectional view, which is taken in the axial direction, illustrating a modified embodiment of the apparatus for automatically switching speed reducing ratio.

Additionally, as shown in FIG. 25, the present invention is also applicable in the following structure. That is, magnets 400, 402 are provided in each side of a stator and a rotator between the input shaft and the output shaft. A ring gear 404 is moved relatively with respect to a planet gear 406. The ring gear 404 is forcibly moved to and retained at the neutral position.

Figure 26:
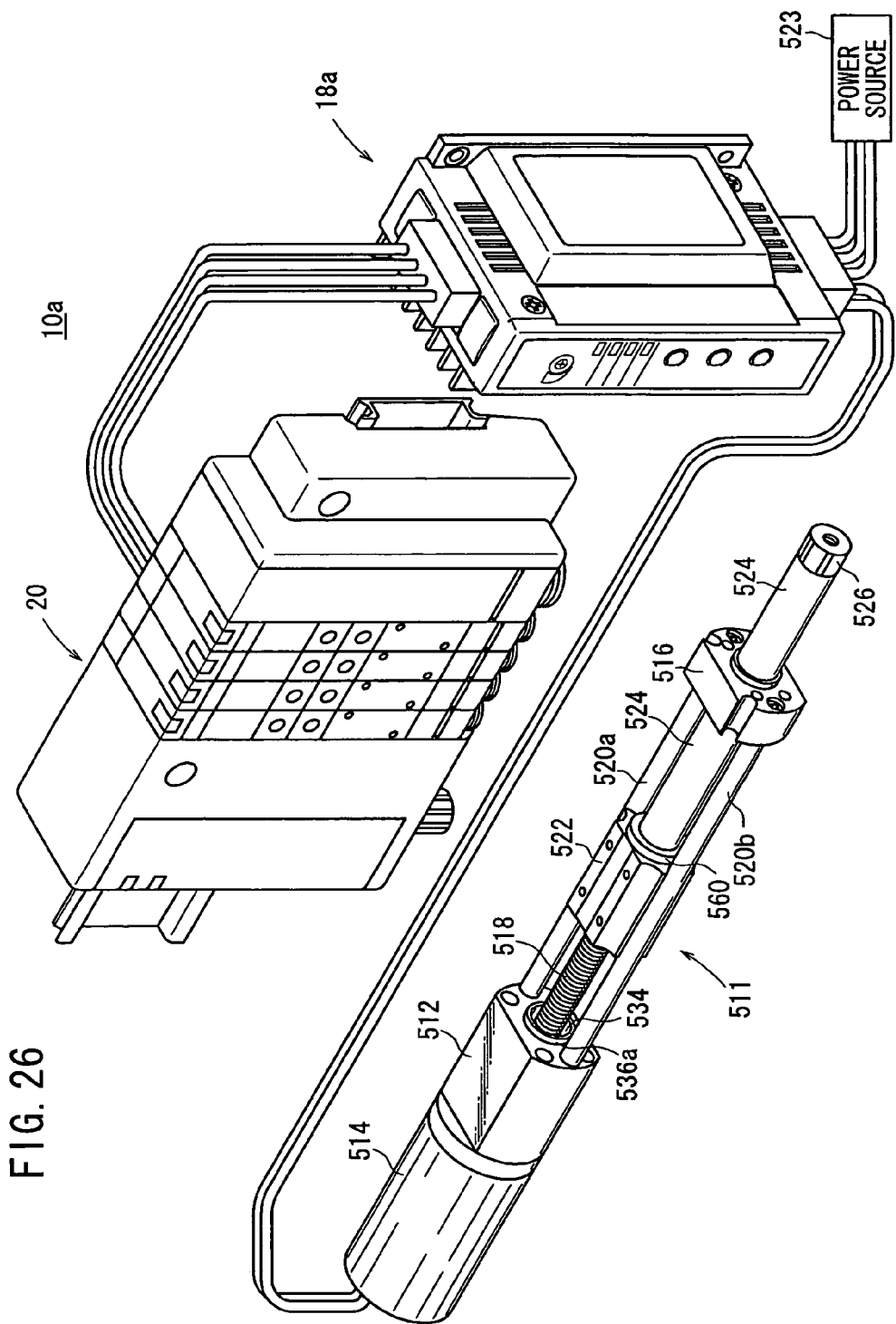
FIG. 26 is a perspective view illustrating a control system into which a driver according to a modified embodiment is incorporated.

Next, FIG. 26 shows a control system 10*a* into which a driver 18*a* according to a modified embodiment is incorporated. The same components as those of the control system 10 shown in FIG. 1 are designated by the same reference numerals, and detailed explanation thereof will be omitted.

The control system 10*a* comprises an electric actuator 511 in which a piston 522 and a piston rod 524 make linear reciprocating motion under the driving action of a rotary driving source 514, the driver 18*a* which energizes and deenergizes the rotary driving source 514 equipped for the electric actuator 511, a controller 20 which derives the direction instruction signal to the driver 18*a*, and a power source 523 which is connected to the driver 18*a* via a connector.

Figure 27:
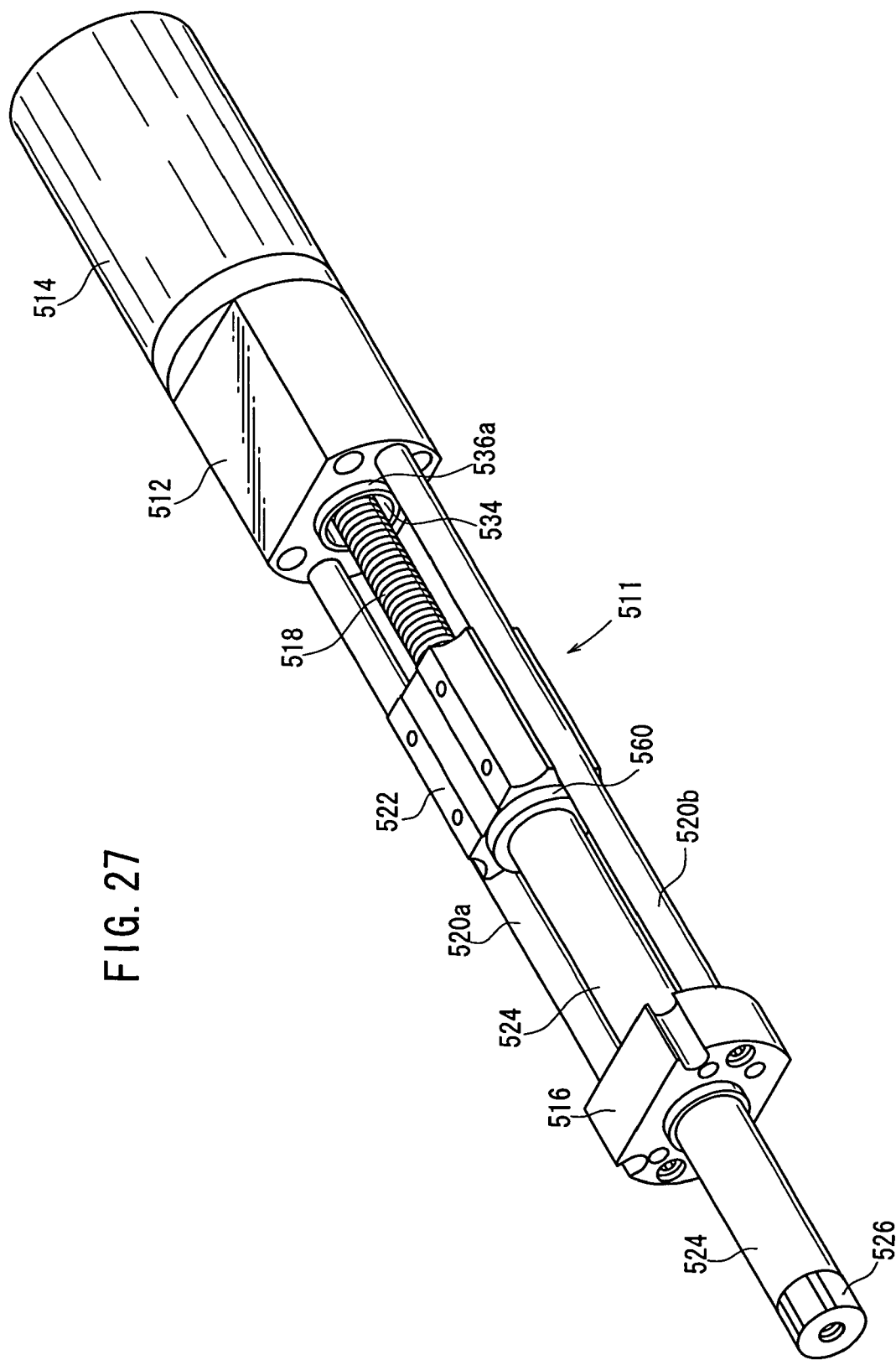
FIG. 27 is a perspective view illustrating an electric actuator for constructing the system.

As shown in FIG. 27, the electric actuator 511 includes a housing 512 which is composed of a substantially flat block member, a rotary driving source 514 which is connected to one end of the housing 512, a rod cover (end block) 516 which is arranged while being separated by a predetermined distance from the housing 512 on the side opposite to the side on which the rotary driving source 514 is connected, and a feed screw shaft 518 which transmits the rotary driving force of the rotary driving source 514 by a coupling member as described later on.

The rotary driving source 514 is appropriately constructed by a servo motor including, for example, a brush-equipped DC motor, a brushless DC motor, and a stepping motor. A linear motor such as a solenoid may be used as the rotary driving source 514.

The electric actuator 511 further includes a pair of guide rods 520*a*, 520*b* which are arranged in parallel with the feed screw shaft 518 interposing therebetween, which have first ends connected to the housing 512 by first screw members 519*a*, 519*b* (see FIG. 28), and which have second ends connected to the rod cover 516 by second screw members 521*a*, 521*b* (see FIG. 28), a piston 522 which is displaceable along the pair of guide rods 520*a*, 520*b* under the driving force transmitted by the feed screw shaft 518, a hollow cylindrical piston rod 524 which penetrates through the rod cover 516 and which makes movement back and forth integrally with the piston 522, and a socket 526 which is installed to the tip end of the piston rod 524 to close the hole.

The piston 522 and the piston rod 524 function as the movable member. It is preferable that an electroless nickel plating treatment is applied as a surface treatment for the feed screw shaft 518. The feed screw shaft 518 may be commonly used as the motor shaft without using the coupling member 528.

Figure 28:
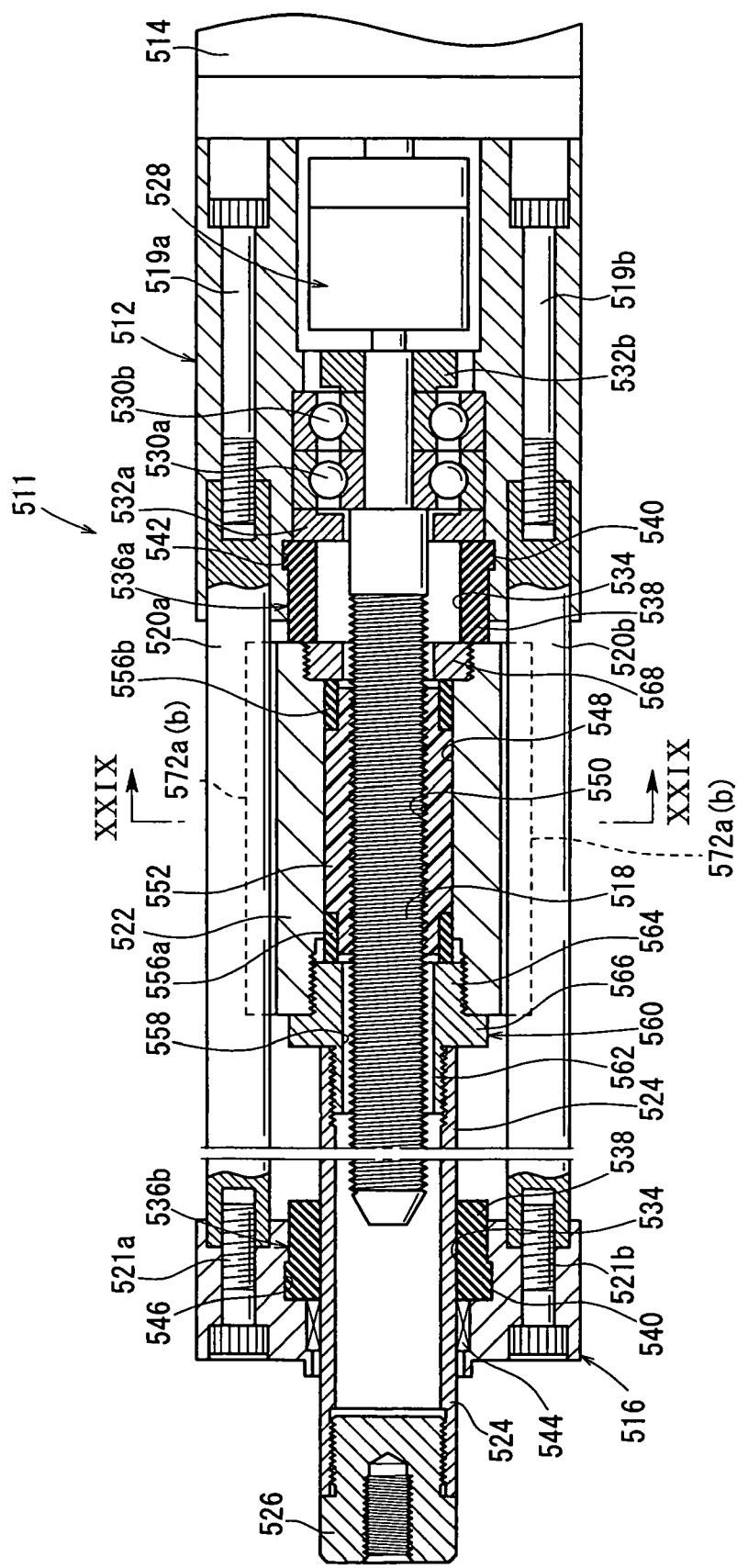
FIG. 28 is a partial longitudinal sectional view taken in the axial direction of the electric actuator shown in FIG. 27.

As shown in FIG. 28, a first bearing 530*a* and a second bearing 530*b* are provided and juxtaposed respectively at the end of the feed screw shaft 518 disposed closely to the coupling member 528 in the housing 512. The first bearing 530*a* and the second bearing 530*b* are retained by a first bearing holder 532*a* and a second bearing holder 532*b*.

Figure 30:
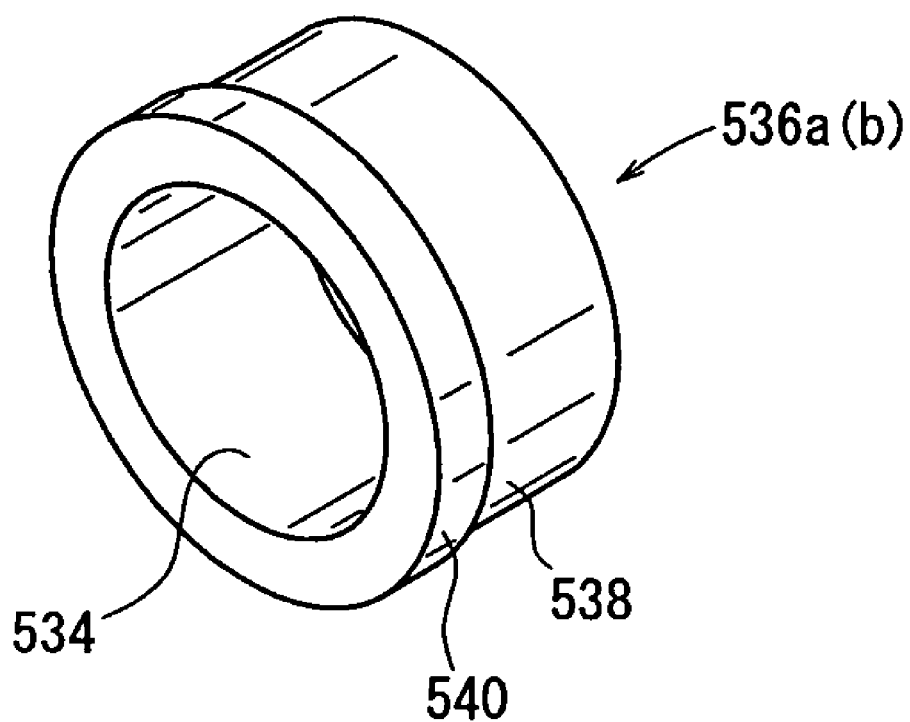
FIG. 30 is a perspective view illustrating an end damper.

A first end damper 536*a*, which has a through-hole 534 for allowing the feed screw shaft 518 to penetrate therethrough, is retained at the end of the housing 512 which faces the piston 522. As shown in FIG. 30, the first end damper 536*a* integrally comprises a cylindrical section 538 which has a predetermined wall thickness, and a flange section 540 which is diametrally expanded slightly in the radially outward direction as compared with the outer diameter of the cylindrical section 538.

In this arrangement, the flange section 540 of the first end damper 536*a* is fastened by an annular recess 542 of the housing 512. Accordingly, the first end damper 536*a* is retained in a state in which a part (end) of the cylindrical section 538 protrudes toward the piston 522 by a predetermined length from the end surface of the housing 512.

A second end damper 536*b* and a bush 544 are provided on the inner wall of the rod cover 516 through which the piston rod 524 penetrates. The second end damper 536*b* has the same shape as that of the first end damper 536*a*. A flange section 540 is fastened by an annular recess 546 of the rod cover 516. Accordingly, the second end damper 536*b* is retained in a state in which a part (end) of a cylindrical section 538 protrudes toward the piston 522 by a predetermined length from the end surface of the rod cover 516.

It is preferable that each of the first end damper 536*a* and the second end damper 536*b* is formed of an elastic member such as urethane rubber.

Figure 29:
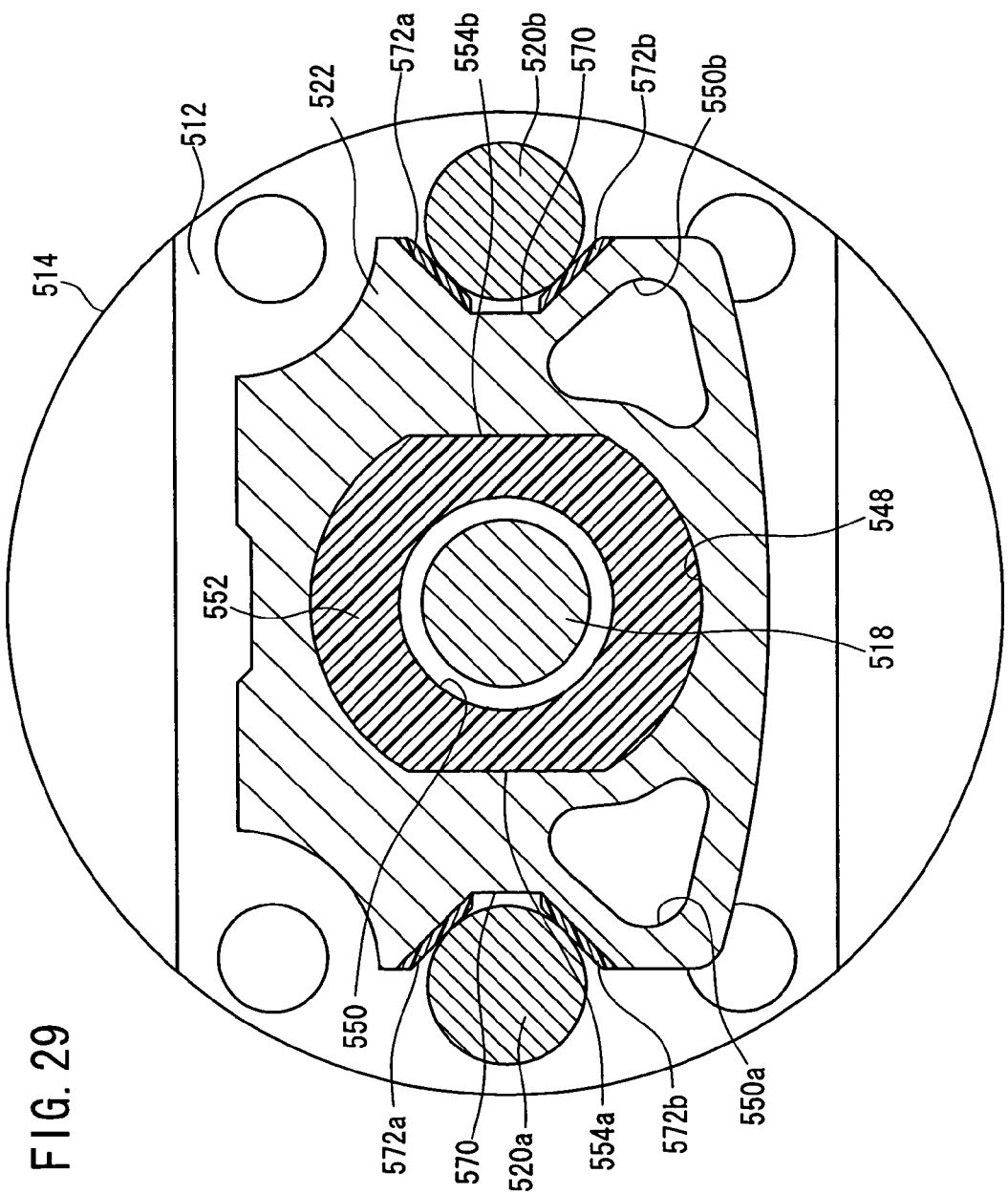
FIG. 29 is a magnified vertical sectional view taken along the line XXIX-XXIX shown in FIG. 27.

As shown in FIG. 29, the piston 522 includes a through-hole 548 having a substantially elliptical vertical cross section formed at a central portion thereof to penetrate in the axial direction, and a pair of lightening holes 550*a*, 550*b* which are formed on the both sides of the through-hole 548 in order to reduce weight. The piston 522 is integrally formed of, for example, a metal material such as aluminum. A substantially cylindrical sliding nut 552, which has a screw hole 550 into which the feed screw shaft 518 is screwed, is inserted into the through-hole 548 of the piston 522 so that the sliding nut 552 is capable of making sliding movement in the axial direction of the feed screw shaft 518.

In this arrangement, the sliding nut 552 and the piston 522 are provided relatively slidably in the axial direction of the feed screw shaft 518. Further, the piston 522 is prevented from rotating in the circumferential direction by a pair of flat surface sections 554*a*, 554*b* which are formed on the outer circumferential surface of the sliding nut 552.

Figure 31:
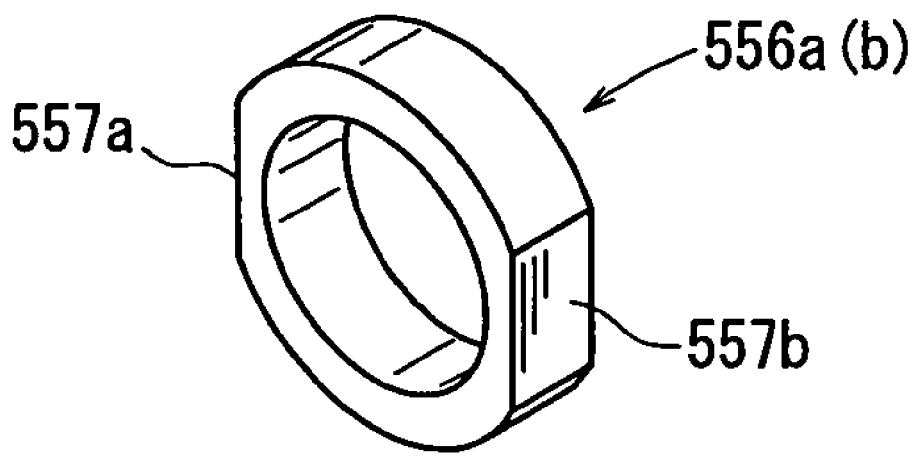
FIG. 31 is a perspective view illustrating a piston damper.

A pair of annular piston dampers 556*a*, 556*b* as shown in FIG. 31 are installed to annular recesses at the both ends of the sliding nut 552. The pair of piston dampers 556*a*, 556*b* are provided to protrude by predetermined lengths in the axial direction from the end surfaces of the sliding nut 552.

In this arrangement, each of the piston dampers 556*a*, 556*b* has a pair of flat surface sections 557*a*, 557*b* formed on the outer circumference thereof (see FIG. 31). The piston dampers 556*a*, 556*b* are formed to be flush with the vertical cross-sectional outer circumferential shape of the sliding nut 552.

A connecting member 560, which has a through-hole 558 for inserting the feed screw shaft 518 thereinto, is provided at one end of the piston 522 in the axial direction. The connecting member 560 comprises a first annular section 564 which has a first screw section composed of a male thread into which a female thread of the piston 522 is screwed, a second annular section 562 which has a second screw section composed of a male thread into which a female thread of the hollow piston rod 524 is screwed, and an annular flange section 566 which is provided between the first annular section 564 and the second annular section 562. The first annular section 564, the second annular section 562, and the annular flange section 566 are formed in an integrated manner.

An annular member 568, which has a male thread section formed on the outer circumferential surface into which the female thread section of the piston 522 is screwed, is connected to the other end of the piston 522 in the axial direction. The annular member 568 is provided to be flush with the end surface of the piston 522.

In this arrangement, one piston damper 556*a*, which protrudes by a predetermined length from the end surface of the sliding nut 552, is provided to make contact with the first annular section 564 of the connecting member 560. The other piston damper 556*b*, which protrudes by a predetermined length from the end surface of the sliding nut 552, is provided to make contact with the annular member 568.

Therefore, the sliding nut 552 is retained in the piston 522 by the connecting member 560 and the annular member 568 which are fixed at the both ends of the piston 522, except when the piston rod 524 abuts against the workpiece W and the impact is exerted on the piston rod 524. The sliding nut 552 is displaceable integrally with the piston 522 in the axial direction under the screw engagement action with respect to the feed screw shaft 518.

It is preferable that the pair of piston dampers 556*a*, 556*b* are formed of elastic members such as urethane rubber in the same manner as the first and second end dampers 536*a*, 536*b*.

Guide sections 570 (see FIG. 29), each of which has a substantially circular arc-shaped cross section, are formed on the both side surfaces of the piston 522 extending perpendicularly to the axis. The piston 522 is interposed between the pair of guide rods 520*a*, 520*b*. A pair of plates 572*a*, 572*b* made of resin, which make line contact with the outer circumferential surfaces of the guide rods 520*a*, 520*b* and which extend in the axial direction of the guide rods 520*a*, 520*b*, are adhered to the guide sections 570. By interposing the plates 572*a*, 572*b* made of the resin material between the piston 522 and the guide rods 520*a*, 520*b* each of which is made of the metal material, it is possible to reduce the sliding resistance.

The load is desirably absorbed by the pair of guide rods 520*a*, 520*b* in any one of a case in which the load is applied to the piston 522 in the radial direction and a case in which the load is applied to the piston 522 in the rotational direction. When the load is applied in the rotational direction, the pair of guide rods 520*a*, 520*b* function to stop the rotation.

Figure 35:
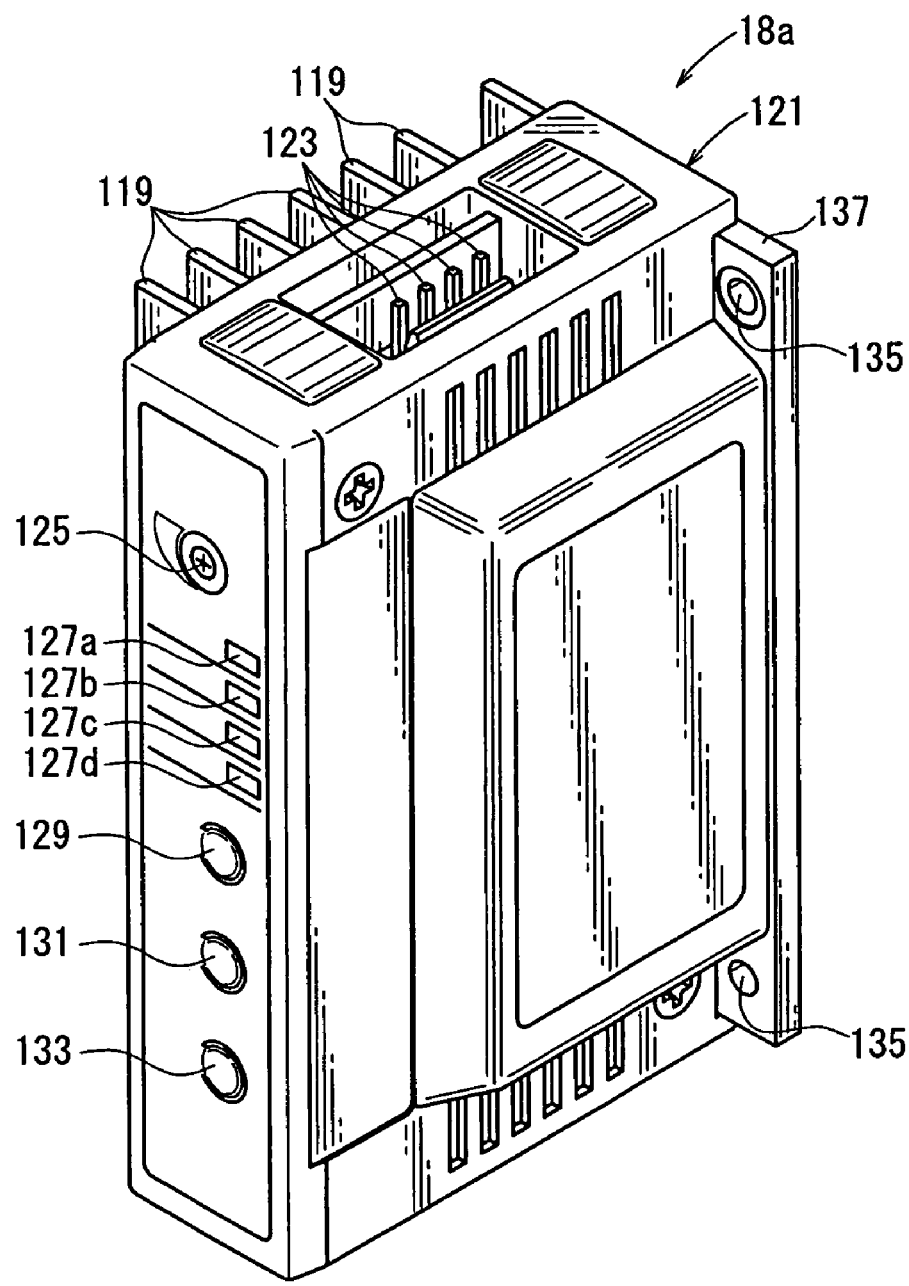
FIG. 35 is a perspective view illustrating a driver for constructing the system.

As shown in FIG. 35, the driver 18*a* has a casing 121 provided with a plurality of fins 119 protruding from a broad side surface. A plurality of control terminals 123, which are electrically connected to the controller 20 via a cable, are provided at an upper portion of the casing 121. Those provided at lower portions of the casing 121 are an unillustrated power source terminal which is connected to the power source 523 via a cable, and an unillustrated output terminal for the rotary driving source which is connected to the rotary driving source 514.

Those provided on a narrow width side surface of the driver 18*a* are a torque-setting trimmer 125 with which the rotational torque (thrust force) of the rotary driving source 514 can be arbitrarily set externally by regulating the angle of rotation in a predetermined direction by using, for example, a plus screwdriver, a plurality of display lamps 127*a* to 127*d* which are recognizable in accordance with the light emission of unillustrated LEDs, and a plurality of manual switches which make it possible to perform, for example, the test operation in accordance with the manual operation.

The manual switches include a PHASE direction-switching switch 129 which indicates two directions of the A-PHASE direction (elongating direction of the piston rod 524) and the B-PHASE direction (shrinking direction of the piston rod 524) in accordance with the ON/OFF operation, an ON/OFF switch 131 which energizes and deenergizes the driver 18*a*, and a SET switch 133 in which the initial setting is established when the switch is turned OFF and the external thrust force can be selected by using the torque-setting trimmer 125 when the switch is turned ON.

With the PHASE direction-switching switch 129, the forward or backward movement of the piston rod 524 is reversed in some cases between the A-PHASE direction and the B-PHASE direction in relation to the unillustrated gear.

The control signal, which is introduced into the driver 18*a* from the controller 20, is composed of a binary signal of ON/OFF.

The rotational speed of the rotary driving source 514 can be controlled by arbitrarily changing the application voltage, which is applied from the power source 523 to the driver 18*a*, by using, for example, an unillustrated resistor, a transformer, or an internal circuit, or by incorporating the rotary driving source 514 into an unillustrated bridge circuit to provide an electronic governor (not shown) for feeding back the unbalanced voltage of the bridge circuit.

A flange 137, through which attachment holes 135 are formed, is formed on a side surface opposite to the narrow width side surface on which the manual switches and other components are provided as described above.

The other portions of the driver 18*a* are constructed in the same manner as the driver 18 shown in FIG. 1 (see FIG. 2), and detailed explanations thereof will be omitted.

The control system 10*a*, into which the driver 18*a* according to the modified embodiment is incorporated, is basically constructed as described above. Next, its operation, function, and effect will be explained.

At first, the direction instruction signal (binary signal) is introduced into the driver 18*a* from the controller 20. The driver 18*a* switches the polarity of the voltage based on the direction instruction signal. Accordingly, the rotation direction of the rotary driving source 514 is switched to the forward or backward direction. The voltage, which corresponds to the current supplied from the direction-switching means 34 to the rotary driving source 514, is inputted into the current amplifier/limiter 36.

The current amplifier/limiter 36 converts the voltage outputted from the direction-switching means 34 into the corresponding current which is supplied to the rotary driving source 514. Accordingly, the rotary driving source 514 is driven and rotated in the predetermined direction, and the rotary driving force of the rotary driving source 514 is transmitted to the feed screw shaft 518 by the coupling member 528.

The feed screw shaft 518, which is rotated in the predetermined direction, is screwed to the screw hole 550 of the sliding nut 552 which functions as the feed nut. Accordingly, the sliding nut 552 and the piston 522 are displaced in the axial direction integrally with the piston rod 524 by the guidance of the pair of guide rods 520*a*, 520*b*. Therefore, the piston rod 524 is displaced toward the outside integrally with the piston 522, and the piston rod 524 arrives at the stroke end, thereby pressing the unillustrated workpiece to the predetermined position.

Figure 32:
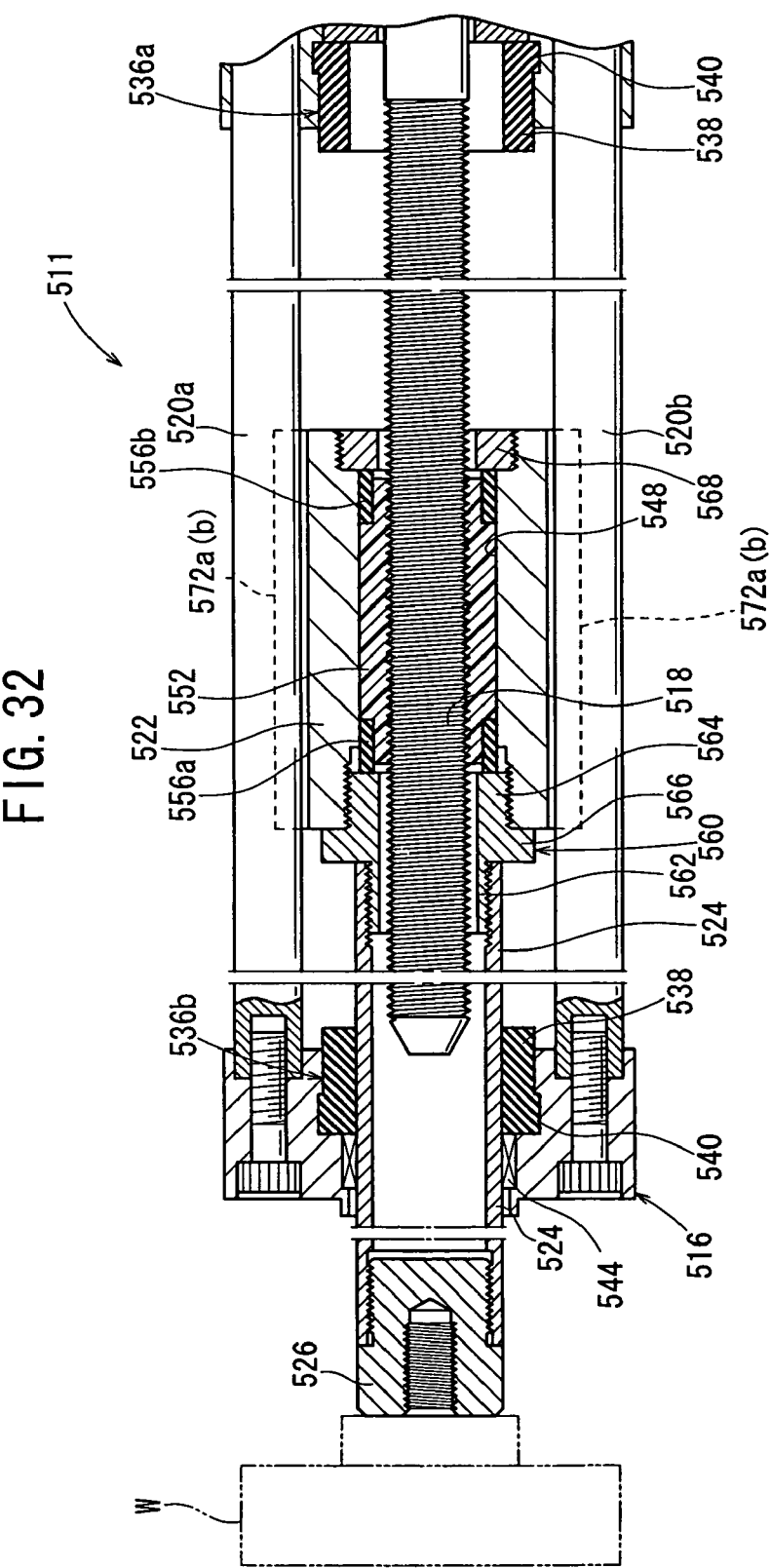
FIG. 32 is a partial longitudinal sectional view illustrating a state in which a piston rod abuts against a workpiece at an intermediate position.

As shown in FIG. 32, when the piston 522 does not arrive at both stroke ends, and the operation for pressing the workpiece W is performed at an intermediate position therebetween, then the impact is transmitted to the piston 522 via the socket 526 which abuts against the workpiece W, the piston rod 524, and the connecting member 560.

Figure 33:
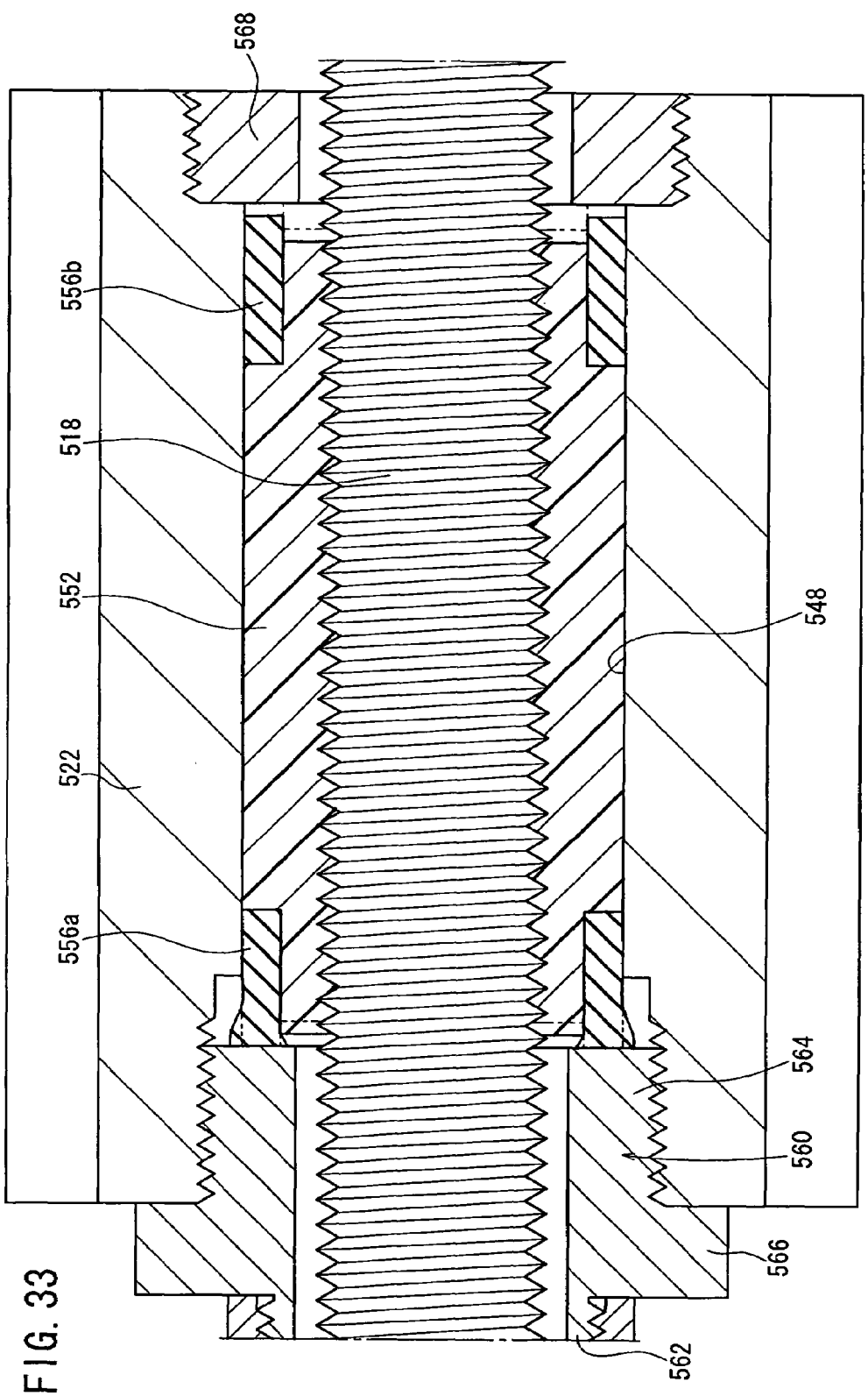
FIG. 33 is a partial magnified longitudinal sectional view illustrating a state in which impact is absorbed by the piston damper in the state shown in FIG. 32.

In this situation, the end portion of the piston damper 556*a*, which contacts the connecting member 560, is deformed as shown in FIG. 33, and thus the impact is received. Further, the sliding nut 552, which is provided in the piston 522, slides slightly in the axial direction of the feed screw shaft 518 with respect to the piston 522 (see two-dot chain lines shown in FIG. 33). Accordingly, the impact is desirably absorbed.

In other words, the piston 522 and the connecting member 560, which are connected to each other, are provided displaceably in the axial direction of the feed screw shaft 518 in response to the impact applied to the piston rod 524. The slight displacement of the piston 522 and the connecting member 560 is absorbed by the piston damper 556*a* which has elasticity and which is installed to the end of the sliding nut 552. Accordingly, the impact is desirably absorbed.

In this situation, the sliding nut 552 is not displaced in relation to the feed screw shaft 518, because the sliding nut 552 is screwed to the feed screw shaft 518. Further, the impact is prevented from being transmitted to the screw engagement portion of the sliding nut 552 and the feed screw shaft 518. Accordingly, it is possible to desirably protect the screw engagement portion of the sliding nut 552 and the feed screw shaft 518.

Therefore, even when the workpiece W is pressed against the piston rod 524 at the intermediate position between both stroke ends, the impact, which is applied to the piston rod 524, is smoothly absorbed by the relative sLiding displacement between the piston 522 and the sliding nut 552 and the elastic piston damper 556*a*. Therefore, it is possible to avoid deterioration of the durability of the electric actuator 511.

Figure 34:
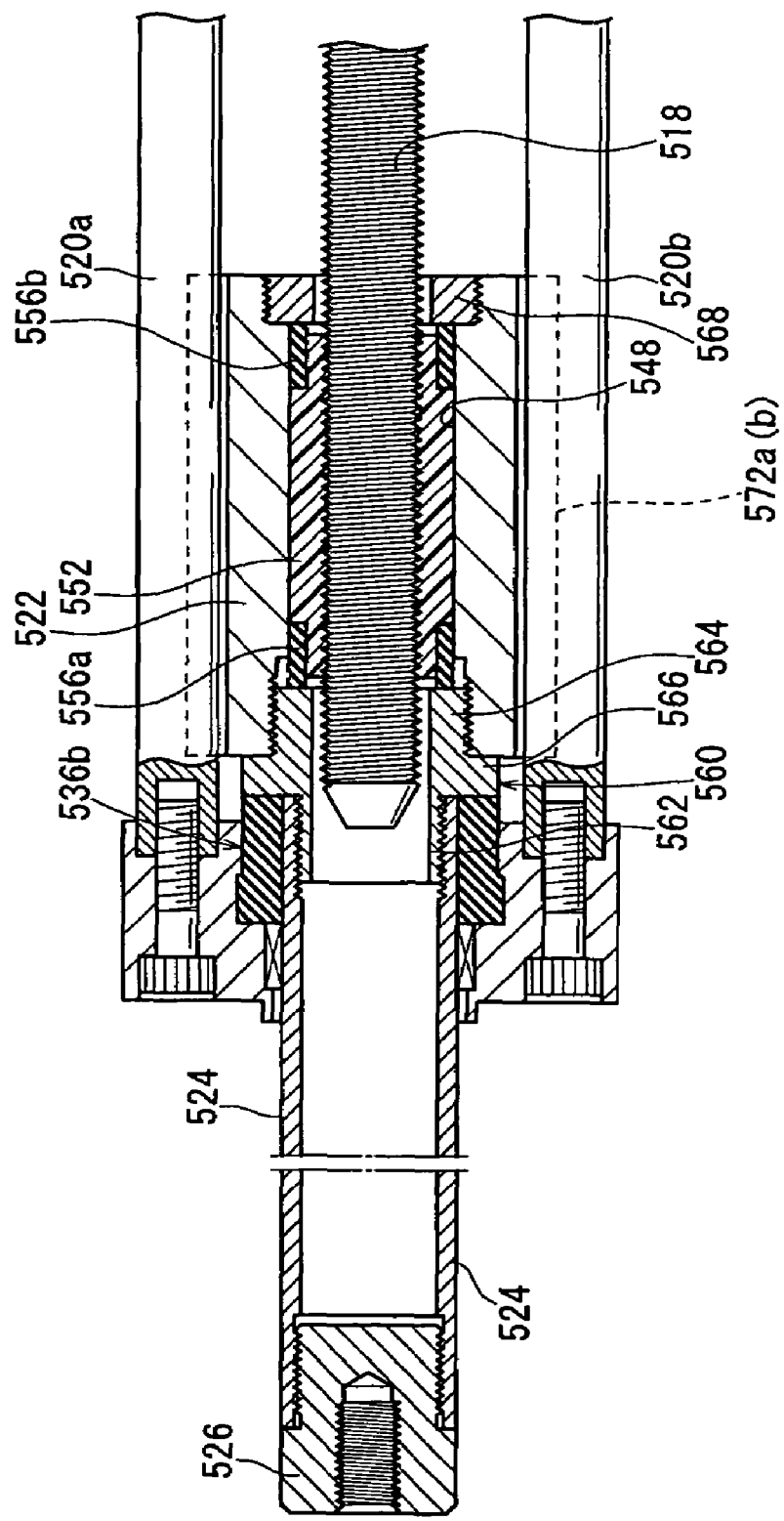
FIG. 34 is a partial magnified longitudinal sectional view illustrating a state in which impact is absorbed by the piston damper and the end damper at the frontward movement end of the piston rod.

Further, when the impact is caused at the forward movement stroke end of the piston rod 524, the impact is absorbed more preferably, because of the synergistic buffering effect of the piston damper 556*a* and abutment of the annular flange section 566 of the connecting member 560 against the second end damper 536*b* (see FIG. 34).

Similarly, when the impact is generated at the backward movement stroke end of the piston rod 524, the impact is absorbed more preferably, because of the synergistic buffering effect of the piston damper 556*b* and abutment of the end surface of the annular member 568 and the piston 522 against the first end damper 536*a* (see FIG. 28).

As described above, the buffering mechanism is provided, which includes the pair of piston dampers 556*a*, 556*b* provided for the piston 522, and the first and second end dampers 536a, 536b provided for the housing 512 and the rod cover 516. Accordingly, the impact on the piston 522 can be preferably buffered at any arbitrary position including both stroke ends and the intermediate position therebetween.

The electric actuator can be used as an actuator driven by the motor usable in the same manner as the air cylinder even in an environment in which compressed air is absent or compressed air cannot be used.

In this case, the phrase "in the same manner as the air cylinder" refers, for example, to the fact that the electric actuator is driven in accordance with the ON/OFF control, no controller is required, it is possible to press the piston 522, the electric actuator can be driven without any sensor, and it is possible to control the speed and the thrust force.

Further, the predetermined rigidity is maintained by the pair of parallel guide rods 520a, 520b without the need for a rigid body. Accordingly, the number of parts is decreased, the production cost is reduced, and it is possible to realize a light weight.

Furthermore, an impact absorber (damper) is generally arranged at a portion where parts collide with each other in the driving apparatus. However, when the property, size, and displacement amount of the damper are set so that the impact value upon collision is not more than 5 G, preferably not more than 2 G, then it is possible to improve the durability of the damper, thereby improving the durability of the electric actuator. The strength of each part can be reduced by suppressing the impact value, and hence it is possible to reduce size and weight of the apparatus.

As for the method for producing the housing 512 and the rod cover 516, it is preferable to use, for example, integrated molding based on aluminum die casting, plate deep drawing, or stacked steel plates integrally formed by stacking a plurality of steel plates.

As for the feed screw shaft 518, it is preferable to use, for example, a slide screw shaft made of resin, a slide screw shaft made of metal, a ball screw shaft, or a timing belt suspended between pulleys.

When the workpiece W is pressed to a predetermined position by the piston rod 524 and a high load is applied to the rotary driving source 514 after the piston 522 and the piston rod 524 arrive at the stroke end, the rotation of the drive shaft of the rotary driving source 514 is stopped and restricted. In this situation, the torque, which is outputted from the drive shaft of the rotary driving source 514, is proportional to the current applied to the rotary driving source 514. Therefore, when the drive shaft is restricted, the current (overcurrent), which is not less than the predetermined current value, is applied to the rotary driving source 514. When the overcurrent is generated, the rotary driving source 514 may undesirably burn out.

Accordingly, the detection signal, which is fed from the current sensor 38 for detecting the current to be supplied to the rotary driving source 514, is introduced into the current amplifier/limiter 36 via the detection line 41. The current amplifier/limiter 36 compares, by the comparing means 44, the preset reference current $I_{MAX}$ stored in the storage means 42 with the detection signal supplied from the current sensor 38. Further, the current, which is to be supplied to the rotary driving source 514, is limited by the current limit means 46 so that the current does not exceed the reference current $I_{MAX}$ (see FIG. 2).

The current value, which is used when the rotary driving source 514 is controlled, is limited, for example, to not more than 0.6 A when the drive shaft of the rotary driving source 514 is stopped and restricted, and not more than 0.2 A during the driving state with no load. Accordingly, the rotary driving source 514 is able to have a long service life.

As described above, in the driver 18a of the present embodiment, the value of the current supplied to the rotary driving source 514 is monitored by the current sensor 38, and the current amplifier/limiter 36 is used to limit the current applied to the rotary driving source 514 to be not more than the reference current $I_{MAX}$. As a result, even when the high load is applied to the rotary driving source 514, and the drive shaft of the rotary driving source 514 in the ON state is stopped and restricted, the current supplied to the rotary driving source 514 is limited to be not more than the preset reference current $I_{MAX}$. Therefore, it is possible to prevent the rotary driving source 514 from burning out by the overcurrent. It is a matter of course that the torque, which is proportional to the application current, can be limited by limiting the application current to be supplied to the rotary driving source 514.

Figure 36:
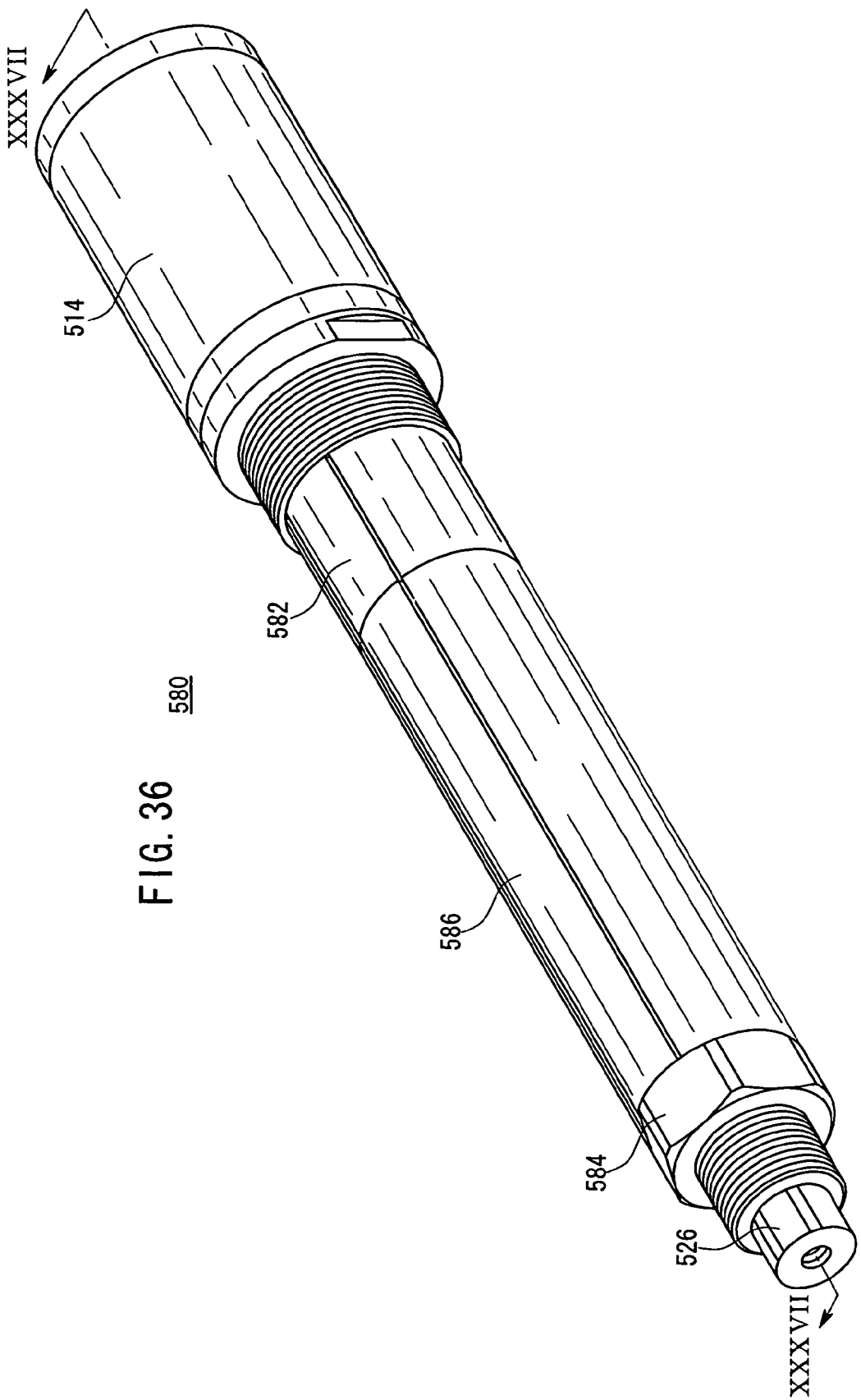
FIG. 36 is a perspective view illustrating another electric actuator to be incorporated into the system.
Figure 37:
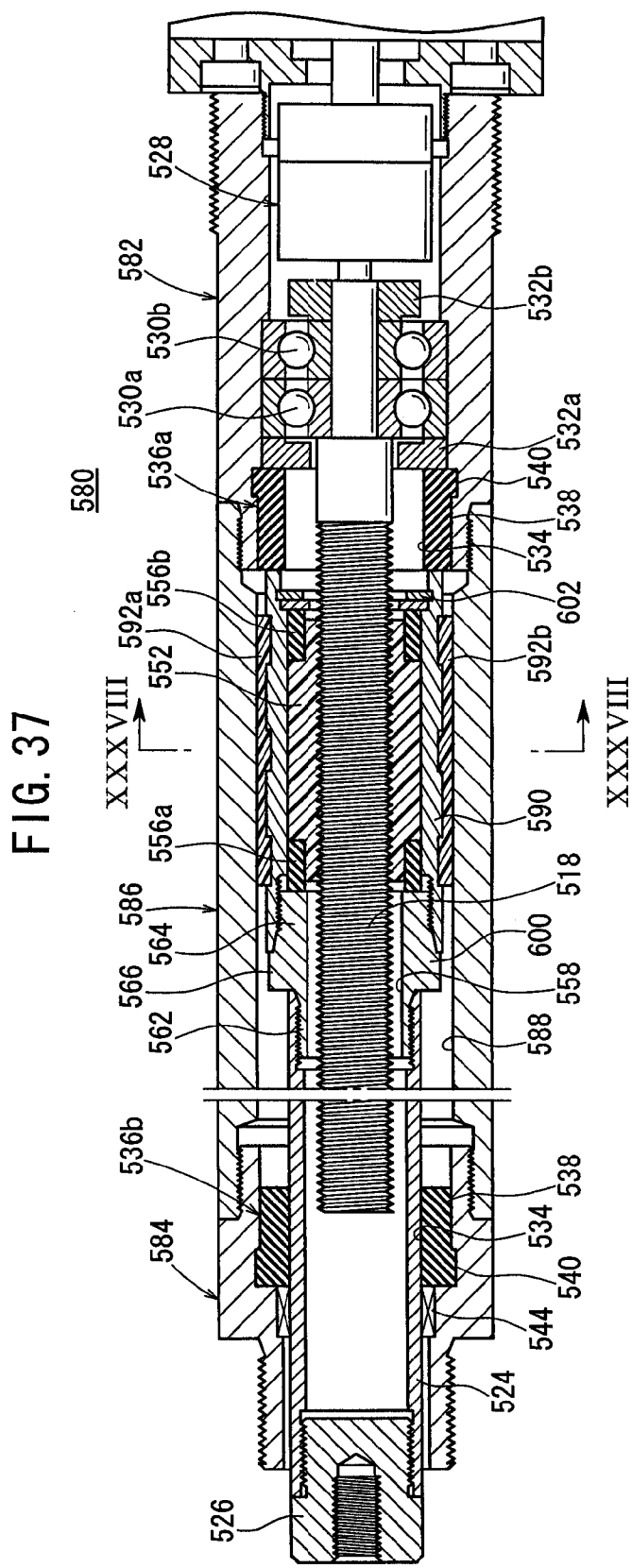
FIG. 37 is a partial longitudinal sectional view taken along the line XXXVII-XXXVII shown in FIG. 36.
Figure 38:
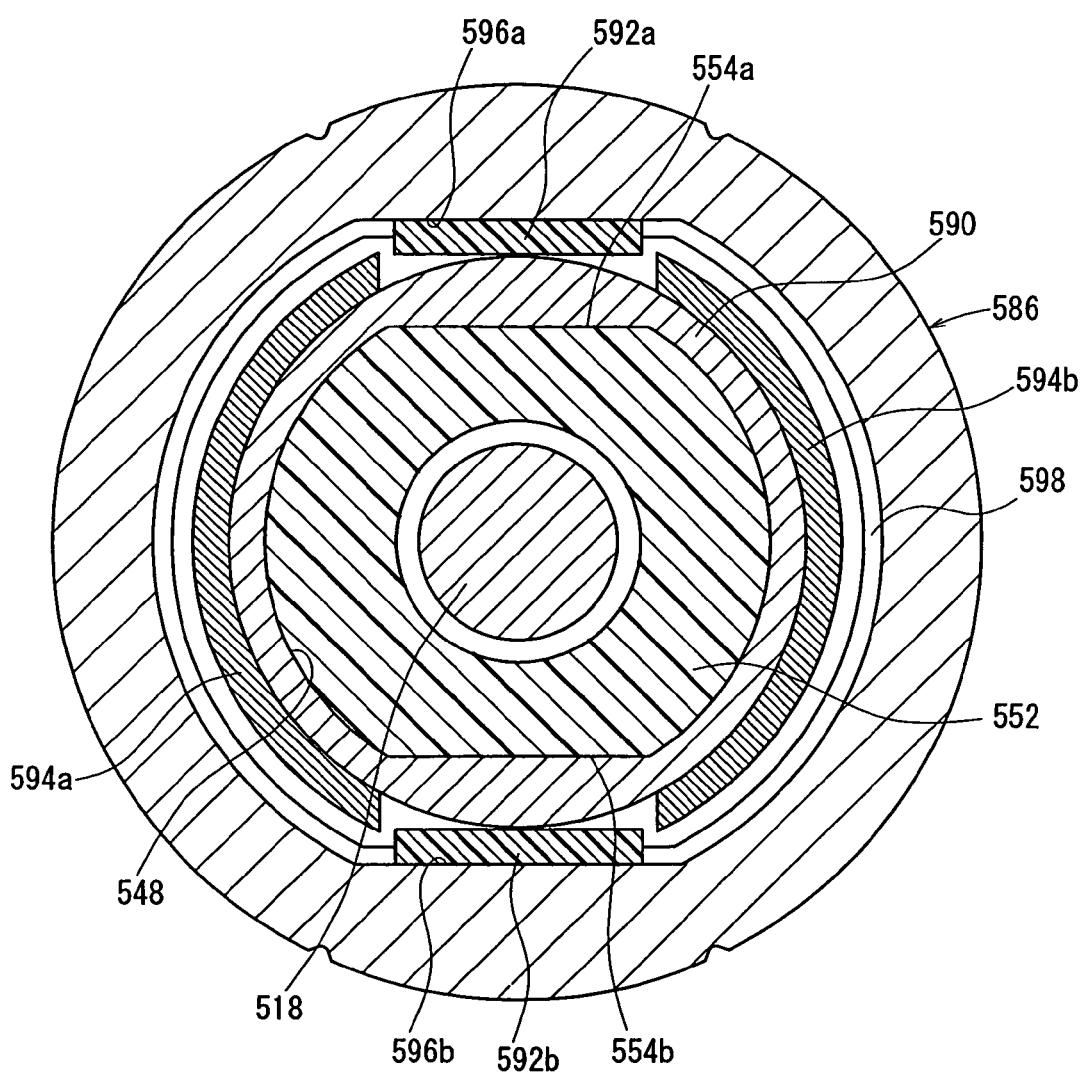
FIG. 38 is a partial magnified longitudinal sectional view taken along the line XXXVIII-XXXVIII shown in FIG. 37.

Next, a modified embodiment of the electric actuator is shown in FIGS. 36 to 38. The same constitutive components as those of the electric actuator 511 shown in FIG. 27 are designated by the same reference numerals, and detailed explanation thereof will be omitted.

An electric actuator 580 according to the present modified embodiment is different from the electric actuator 511 in that the pair of guide rods 520a, 520b is not provided, a lengthy cylindrical tube 586 is provided to connect a cylindrical housing 582 and a stepped cylindrical rod cover 584, and a piston 590 is accommodated in a hollow section 588 of the tube 586.

Those secured to recesses of the outer circumferential surface of the piston 590 are a pair of guide plates 592a, 592b each of which is made of a resin material and which extend in the axial direction, and a pair of magnets 594a, 594b each of which has a semicircular form with a circular arc-shaped cross section.

In this arrangement, only the pair of guide plates 592a, 592b slides along flat guide surfaces 596a, 596b formed on the inner wall of the tube 586. Therefore, the piston 590 is guided and the tube 586 is prevented from rotating in the circumferential direction. A predetermined clearance 598 is provided between the outer wall of the piston 590 and the inner wall of the tube 586 at a portion except for the guide plates 592a, 592b (see FIG. 38).

The sliding nut 552 having the same shape is installed slidably in the piston 590 in the same manner as the electric actuator 511 described above. The sliding nut 552 is retained by a connecting member 600 which is connected to one end of the piston 590 and a C-clip 602 which is installed to the other end of the piston 590.

One or more of sensors including, for example, proximity sensors and photomicrosensors is attached to a predetermined portion on the outer circumferential surface of the tube 586 by an unillustrated band. The magnetic fields of the magnets 594a, 594b are detected by a sensor (not shown) installed to the tube 586. Accordingly, the position of the piston 522 is detected.

The functions of the pair of piston dampers 556a, 556b and the first and second end dampers 536a, 536b are the same as those of the electric actuator 511, and detailed explanation thereof will be omitted.

In the present embodiment, although only the electric actuator of the rod type, in which the piston rod 524 expands and contracts, is disclosed, there is no limitation thereto. It is a matter of course that the present invention is also applicable to the electric actuator of the slide table type used by connecting an unillustrated slide table to the piston 522.

When the electric actuator of the slide table type is adopted, the rod type can be easily changed to the slide table type by detaching the piston rod 524 from the piston 522 and by using another unillustrated rod cover in which the hole for allowing the piston rod 524 to penetrate therethrough is closed.

It is preferable that the control system 10a is incorporated with an apparatus which automatically switches speed reducing ratio when the load, which exceeds the predetermined torque, is applied to the rotary driving source 514. Since, the speed of rotation of the rotary driving source 514 can be controlled depending on the load.

Figure 39:
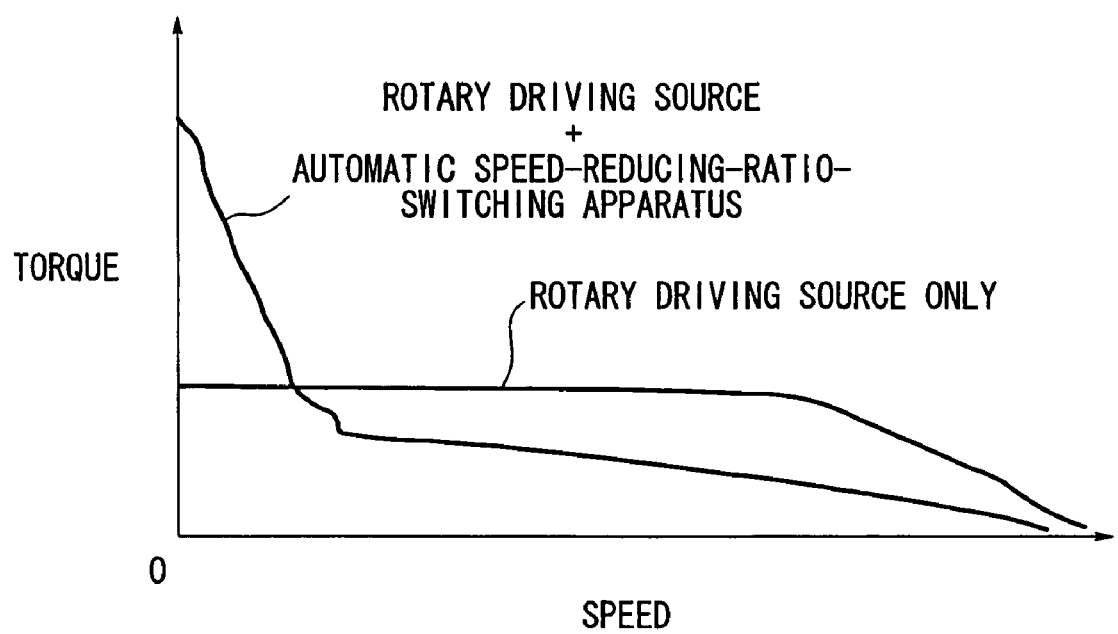
FIG. 39 is a characteristics chart illustrating the relationship between torque and speed obtained when a rotary driving source is used alone or with a speed reducer.

FIG. 39 shows characteristics of the torque and the speed obtained when only the rotary driving source 514 is provided and when the rotary driving source 514 is equipped with an apparatus for automatically switching speed reducing ratio. As shown in FIG. 39, a torque with respect to a speed can be controlled easily when the rotary driving source 514 is equipped with the apparatus for automatically switching speed reducing ratio as compared with the case in which only the rotary driving source 514 is provided.

Figure 40:
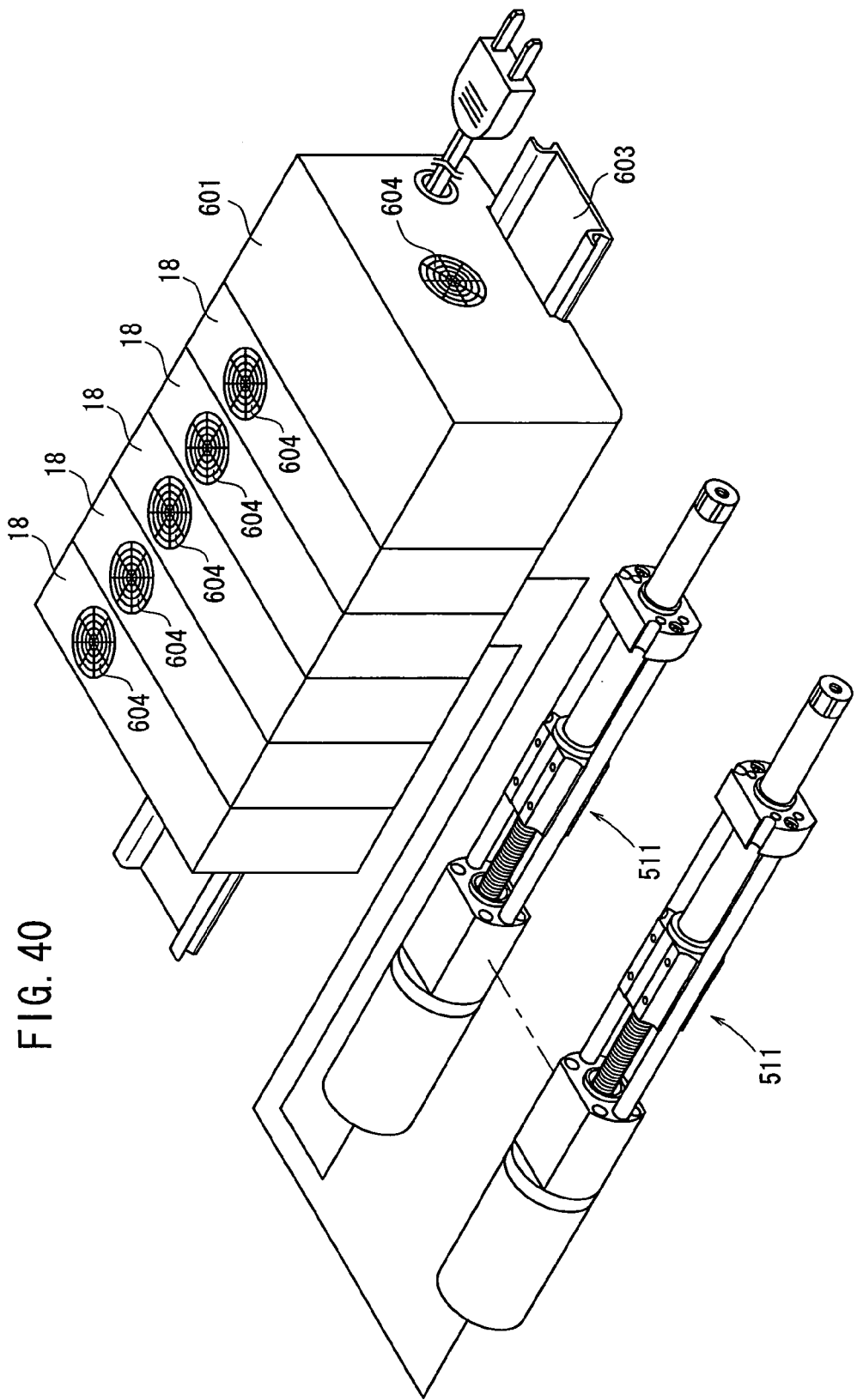
FIG. 40 is a perspective view in which a plurality of direction control drivers are assembled into a manifold.

FIG. 40 shows a perspective view illustrating a driver manifold for direction control.

A plurality of drivers 18 for direction control, which are connected to a plurality of electric actuators 511 (electric cylinders), are stacked to constitute the manifold. In this arrangement, the plurality of drivers 18 for direction control are bus-coupled by the electric signal (for example, a serial signal) via unillustrated connectors. It is preferable that a power source-generating unit 601 is additionally provided to generate, for example, AC 100 to 200 V or DC 24 V which is to be supplied. The plurality of drivers 18 for direction control are detachably stacked by a lengthy rail member 603. It is preferable that fans 604 are provided for the drivers 18 and the power source-generating unit 601.

Figure 41:
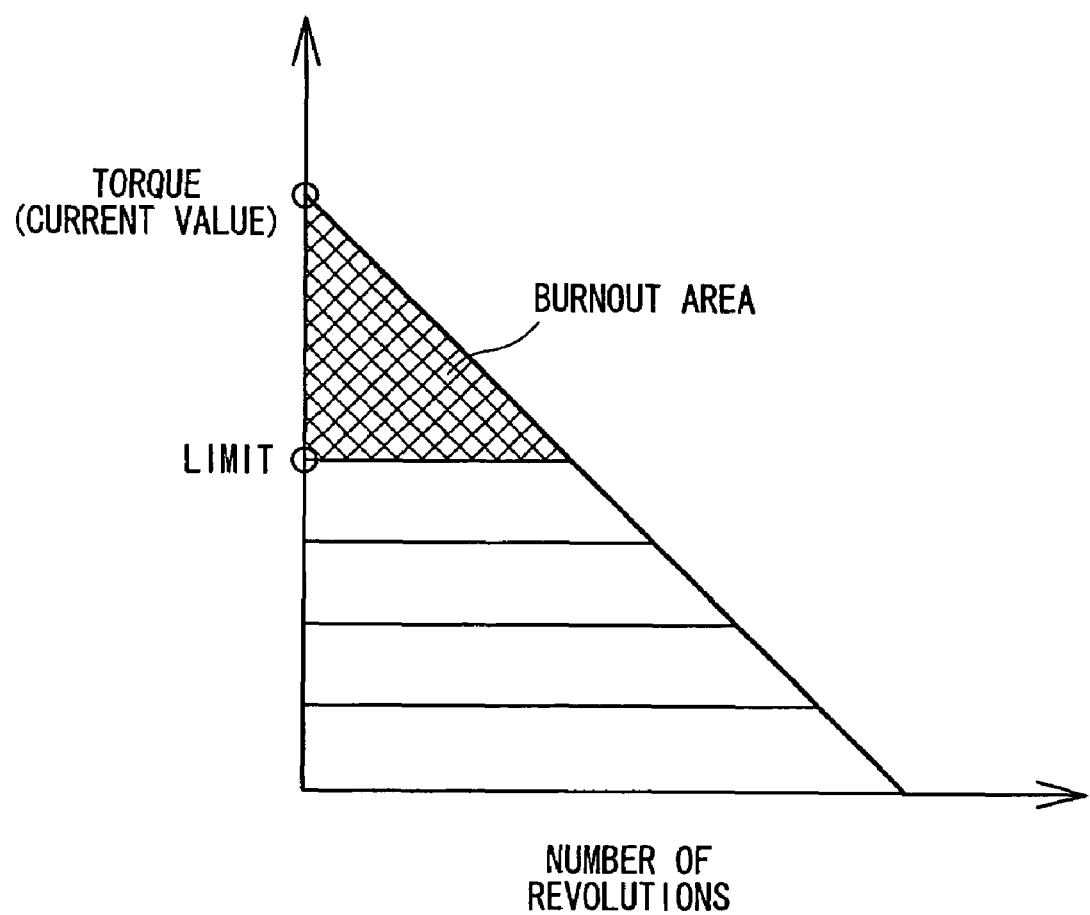
FIG. 41 is a characteristics chart illustrating motor driver characteristics.
Figure 42:
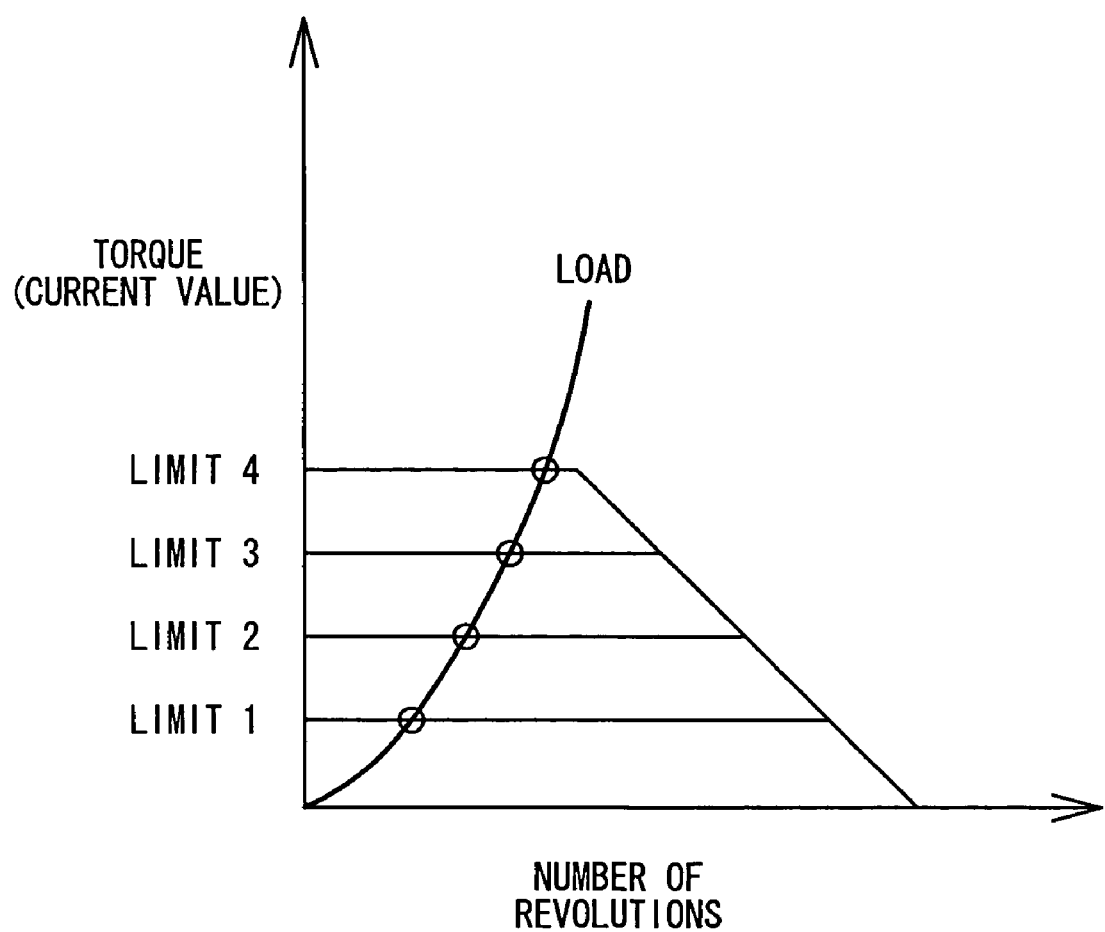
FIG. 42 is a characteristics chart illustrating the load-speed control characteristics.

Next, FIG. 41 shows a motor driver characteristic in relation to the number of revolutions and the torque (current value). As shown in FIG. 41, when the current is limited, then the motor (rotary driving source 514) can be prevented from burning out, and it is possible to limit the torque. FIG. 42 shows a load-speed control characteristic in relation to the relationship between the number of revolutions and the torque (current value). When the current value is set corresponding to the load, the current limits (for example, Limits 1 to 4) are set. In this case, the load is based on, for example, the generator and the internal viscous resistance.

In the foregoing description, the motor includes, for example, at least DC motors, coreless motors, brushless DC motors, linear motors, and voice coil motors.

The drivers 18, 18a, which are direction control apparatuses incorporated into the control systems 10, 10a, correspond to the open network (for example, the device net, PROFIBUS, CAN, and Inthernet) respectively. It is possible to form a network together with other control apparatuses. For example, remote operation and diagnosis can be performed via the internet or the portable terminal (including portable telephones) by using the network.

Further, a direction control apparatus of the composite type body makes it possible to control a plurality of motors by using one direction control apparatus. The direction control apparatus can be driven, for example, by a battery and a cell (including a fuel cell) instead of an ordinary power source.

Although certain preferred embodiments of the present invention have been shown and described in detail, it should be understood that various changes and modifications may be made therein without departing from the scope of the appended claims.

What is claimed is:

1. A control system for an electric actuator having a movable member which is displaceable under a rotary driving action of a rotary driving source, said control system comprising:

said electric actuator having said movable member which makes linear reciprocating motion under said driving action of said rotary driving source;

a driver which energizes and deenergizes said rotary driving source equipped for said electric actuator; and a controller which outputs a direction instruction signal to said driver, wherein said electric actuator includes an actuator body, said rotary driving source which is connected to one end of said actuator body, a pair of guide shafts which extend in parallel between said actuator body and an end block, a feed screw shaft which is connected to a drive shaft of said rotary driving source, and said movable member which makes said linear reciprocating motion along said pair of guide shafts by screwing said feed screw shaft;

and said driver is provided with a current-detecting means which detects a current supplied to said rotary driving source, a comparing means which compares a detection signal from said current-detecting means with a preset reference current, and a current limit means which, without cutting off supply of said current to said rotary driving soure, limits said current supplied to said rotary driving source so that said current does not exceed said reference current when a load is applied to said rotary driving source while maintaining an energized state and said drive shaft of said rotary driving source is stopped and restricted.

2. The control system according to claim 1, wherein said movable member of said electric actuator includes a piston which is displaceable along a pair of guide rods under a driving force transmitted via said feed screw shaft, and a hollow cylindrical piston rod which penetrates through said end block and which makes movement back and forth integrally with said piston;

a sliding nut, which has a screw hole for being screwed to said feed screw shaft, is internally fitted to a through-hole which is formed in an axial direction of said piston; and a pair of piston dampers formed of an elastic material are provided at both ends of said sliding nut in an axial direction in a state in which said pair of piston dampers protrude by predetermined lengths from end surfaces of said sliding nut.

3. The control system according to claim 2, further comprising a pair of first and second end dampers which are arranged in said actuator body and which absorb impact at stroke ends of said piston rod.

4. The control system according to claim 1, wherein a torque-setting trimmer which sets a rotational torque of said rotary driving source from outside, a plurality of display lamps, and a plurality of manually operatable switches are provided on a narrow side surface of said driver; and said manual switches include a PHASE direction-switching switch which performs switching between an elongating direction of said movable member and a shrinking direction of said movable member.

5. The control system according to claim 1, wherein a mechanism for switching speed reducing ratio is interposed between said rotary driving source and said feed screw shaft, said mechanism for switching speed reducing ratio being provided with a sun gear, a planet gear, and an internal gear each of which is composed of helical gear.

6. The control system according to claim 1, wherein said driver has a casing which includes a plurality of fins protruding from a broad side surface.

7. The control system according to claim 1, wherein a plurality of said drivers are continuously stacked to form a manifold.

* * * * *